US007890430B2

(12) United States Patent
Lopatic

(10) Patent No.: US 7,890,430 B2
(45) Date of Patent: Feb. 15, 2011

(54) TECHNIQUE FOR LICENSE MANAGEMENT AND ONLINE SOFTWARE LICENSE ENFORCEMENT

(75) Inventor: Thomas Lopatic, Unterschleissheim (DE)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 12/349,304

(22) Filed: Jan. 6, 2009

(65) Prior Publication Data

US 2009/0187995 A1 Jul. 23, 2009

Related U.S. Application Data

(62) Division of application No. 09/921,785, filed on Aug. 3, 2001, now abandoned.

(30) Foreign Application Priority Data

Mar. 21, 2001 (EP) ................................. 01107039

(51) Int. Cl.
*G06Q 20/00* (2006.01)

(52) U.S. Cl. ........................................ 705/59; 717/168

(58) Field of Classification Search .................. 705/59; 717/168

See application file for complete search history.

(56) References Cited

U.S. PATENT DOCUMENTS 4,802,165 A 1/1989 Ream et al.
5,155,847 A 10/1992 Kirouac et al.
5,553,139 A 9/1996 Ross et al.
5,925,127 A 7/1999 Ahmad
6,006,190 A 12/1999 Baena-Arnaiz et al.
6,141,698 A 10/2000 Krishnan et al.
6,345,256 B1 2/2002 Milsted et al.
6,766,305 B1 7/2004 Fucarile et al.
6,801,999 B1 10/2004 Venkatesan et al.
6,817,535 B2 11/2004 Epstein et al.
6,834,343 B1 12/2004 Burns et al.
6,898,788 B2 5/2005 Kosaka et al.
6,948,164 B2 9/2005 Tinker et al.
7,359,881 B2 * 4/2008 Stefik et al. ................... 705/51
2002/0107809 A1 8/2002 Biddle et al.
2005/0183072 A1 8/2005 Homing et al.

FOREIGN PATENT DOCUMENTS

WO WO 99/04354 1/1999
WO WO 99/64973 12/1999

* cited by examiner

*Primary Examiner*—Jamie Kucab
(74) *Attorney, Agent, or Firm*—Buchenhorner Patent Law

(57) ABSTRACT

A software protection is presented comprising software license management and online software license enforcement, wherein individual licenses are provided for regulating the use of a software product, and the software product is individualized while being downloaded from a license server, and the execution of each individualized software product is monitored in agreement with the individual license terms corresponding to the individual software download.

30 Claims, 14 Drawing Sheets

Figure 1:
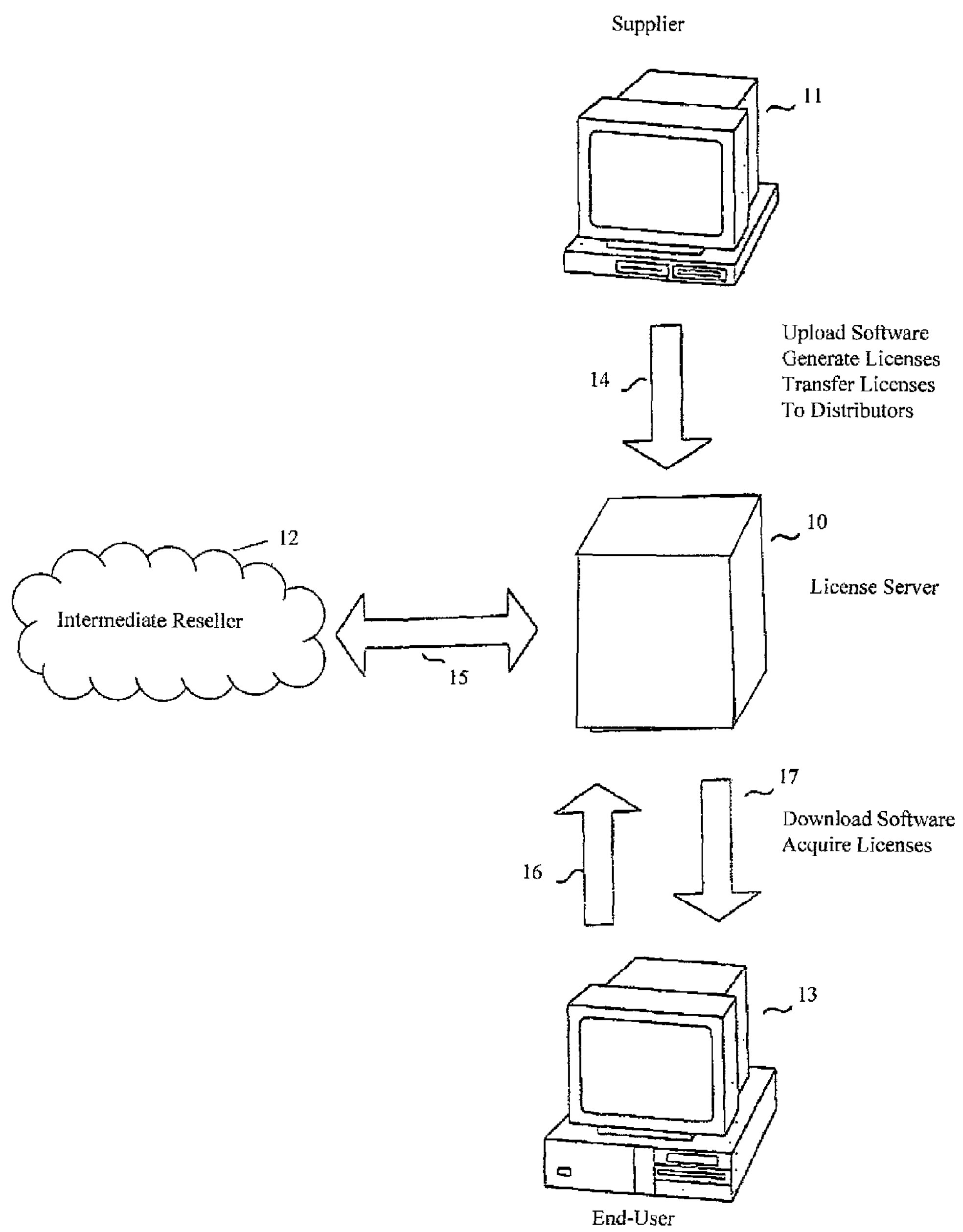

Supplier 11
Software Product Upload
Upload Related License Scheme
40
License Server 10
Confirm EDU-Registration
Trust Centre 41
Reseller 12
License Transfer
Acquire License
Register
Deny Permission To Run
Request Permission To Run
Grant Permission To Run
Request Permission To Run
Download Software
Establish Proof of EDU- Identity
Comercial User C
EDU-User U
13a
13b
Request EDU-License
License Transfer

Figure 2a/1

Policy for educational licenses (license type "Educ")

| | Pro | Dis | Dea | Dea-E | Com | Gov | Edu | Anon |
|---|---|---|---|---|---|---|---|---|
| **Provide** | Y | N | N | N | N | N | N | N |
| **Transfer to Dis** | Y | Y | N | N | N | N | N | N |
| **Transfer to Dea** | N | N | N | N | N | N | N | N |
| **Transfer to Dea-E** | N | Y | N | Y | N | N | N | N |
| **Transfer to Com** | N | N | N | N | N | N | N | N |
| **Transfer to Gov** | N | N | N | N | N | N | N | N |
| **Transfer to Edu** | N | N | N | Y | N | N | Y | N |
| **Transfer to Anon** | N | N | N | N | N | N | N | N |
| **Use** | N | N | N | N | N | N | Y | N |

Policy for evaluation licenses (license type "Eval")

| | Pro | Dis | Dea | Dea-E | Com | Gov | Edu | Anon |
|---|---|---|---|---|---|---|---|---|
| **Provide** | Y | N | N | N | N | N | N | N |
| **Transfer to Dis** | Y | Y | N | N | N | N | N | N |
| **Transfer to Dea** | N | Y | Y | Y | N | N | N | N |
| **Transfer to Dea-E** | N | Y | Y | Y | N | N | N | N |
| **Transfer to Com** | N | N | Y | Y | Y | Y | Y | Y |
| **Transfer to Gov** | N | N | Y | Y | Y | Y | Y | Y |
| **Transfer to Edu** | N | N | Y | Y | Y | Y | Y | Y |
| **Transfer to Anon** | N | N | Y | Y | Y | Y | Y | Y |
| **Use** | N | N | N | N | Y | Y | Y | Y |

Policy for commercial licenses (license type "Comm")

| | Pro | Dis | Dea | Dea-E | Com | Gov | Edu | Anon |
|---|---|---|---|---|---|---|---|---|
| **Provide** | Y | N | N | N | N | N | N | N |
| **Transfer to Dis** | Y | Y | N | N | N | N | N | N |
| **Transfer to Dea** | N | Y | Y | N | N | N | N | N |
| **Transfer to Dea-E** | N | N | N | N | N | N | N | N |
| **Transfer to Com** | N | N | Y | N | Y | Y | Y | N |
| **Transfer to Gov** | N | N | Y | N | Y | Y | Y | N |
| **Transfer to Edu** | N | N | Y | N | Y | Y | Y | N |
| **Transfer to Anon** | N | N | N | N | N | N | N | N |
| **Use** | N | N | N | N | Y | Y | Y | N |

Figure 2a/2

Policy for dealer licenses (license type "Deal")

| | Pro | Dis | Dea | Dea-E | Com | Gov | Edu | Anon |
|---|---|---|---|---|---|---|---|---|
| **Provide** | Y | N | N | N | N | N | N | N |
| **Transfer to Dis** | Y | Y | N | N | N | N | N | N |
| **Transfer to Dea** | N | Y | Y | Y | N | N | N | N |
| **Transfer to Dea-E** | N | Y | Y | Y | N | N | N | N |
| **Transfer to Com** | N | N | N | N | N | N | N | N |
| **Transfer to Gov** | N | N | N | N | N | N | N | N |
| **Transfer to Edu** | N | N | N | N | N | N | N | N |
| **Transfer to Anon** | N | N | N | N | N | N | N | N |
| **Use** | N | N | Y | Y | N | N | N | N |

Fig. 2b

Characteristics of available license classes for a selected product suite consisting of a word processor, a spreadsheet and a database application.

| Class | Type | Product(s) | # Simult. Users | # Usages | Validity Period |
|---|---|---|---|---|---|
| **EDU-1** | Educ | Word Processor 1.0<br>Spreadsheet 1.0<br>Database 1.0 | 50 | unlimited | 5a |
| **EDU-2** | Educ | Word Processor 1.0<br>Spreadsheet 1.0<br>Database 1.0 | 1 | unlimited | unlimited |
| **EVA-1** | Eval | Word Processor 1.0<br>Spreadsheet 1.0<br>Database 1.0 | 1 | 50 | 30d |
| **COM-1** | Comm | Word Processor 1.0<br>Spreadsheet 1.0<br>Database 1.0 | 10 | unlimited | 5a |
| **COM-2** | Comm | Word Processor 1.0<br>Spreadsheet 1.0<br>Database 1.0 | 50 | unlimited | 5a |
| **COM-3** | Comm | Word Processor 1.0<br>Spreadsheet 1.0<br>Database 1.0 | unlimited | unlimited | 5a |
| **DEA-1** | Deal | Word Processor 1.0<br>Spreadsheet 1.0<br>Database 1.0 | 1 | unlimited | 1a |

Fig. 2c

| | |
|---|---|
| Licensee | 19650630 |
| License Identification | 19950508 |

[The following lines were copied from the license class "EDU-1" on creation.]:

| | |
|---|---|
| Licensed software | Word Processor 1.0 |
| | Spreadsheet 1.0 |
| | Database 1.0 |
| Maximal number of concurrent users | 50 |
| Maximal number of program invocations | Unlimited |
| Valid through | March 2006 |

[The following lines were copied from the license policy corresponding to the license type "Educ".]

| License Policy | Pro | Dis | Dea | Dea-E | Com | Gov | Edu | Anon |
|---|---|---|---|---|---|---|---|---|
| **Provide** | Y | N | N | N | N | N | N | N |
| **Transfer to Dis** | Y | Y | N | N | N | N | N | N |
| **Transfer to Dea** | N | N | N | N | N | N | N | N |
| **Transfer to Dea-E** | N | Y | N | Y | N | N | N | N |
| **Transfer to Com** | N | N | N | N | N | N | N | N |
| **Transfer to Gov** | N | N | N | N | N | N | N | N |
| **Transfer to Edu** | N | N | N | Y | N | N | Y | N |
| **Transfer to Anon** | N | N | N | N | N | N | N | N |
| **Use** | N | N | N | N | N | N | Y | N |

TECHNIQUE FOR LICENSE MANAGEMENT AND ONLINE SOFTWARE LICENSE ENFORCEMENT

RELATED APPLICATION

This application is a divisional of U.S. Ser. No. 09/921,785, filed Aug. 3, 2001, which claims the benefit of priority from European (EPO) Application Serial No. 01107039.8, filed Mar. 21, 2001, the entire contents of which are incorporated herein by reference.

BACKGROUND OF THE INVENTION

The present invention relates to techniques for preventing fraudulent use of software products. In particular, the present invention provides a license management system and a technique for enforcing the use of a software product according to the corresponding license terms.

One of the most significant problems in software distribution is the protection of the rights of software producers and other subjects involved in software distribution. The subject holding the rights on a software product is very often distinct from the actual producer of it. Therefore, the subject owning the rights on a software product will be referred to as software supplier in the context of this discussion. Further, within the process of software distribution a subject acquiring licenses for a software product from a supplier and reselling those licenses to other distributors, dealers or end-users is defined as a distributor in this context. Hereby, the term dealer describes a subject which acquires licenses for further reselling them to other dealers or end-users, and an end-user is defined as a subject, which acquires a license on a software product for utilizing it.

The pricing scheme of a software product usually does not comprise only a single value, but a list of graduated prices reflecting considerations like the volume of an order and/or the number of installations of a software product already in use at a customer's site and/or if the customer is a governmental, commercial or educational end-user. This price range very often forms an incentive for fraud. For example, a price for an educational copy of a software product is usually calculated to be just a small fraction of the price to be paid for a copy of the same software product sold for commercial use. Dealers are therefore frequently tempted to sell a copy of a software product to a commercial end-user which has explicitly been acquired by the dealer at a substantially lower price for an educational end-user.

Another annoyance for software suppliers is software pirating and the distribution of bootlegs, which considerably reduces the achievable revenue. Software pirates prefer to act in countries where it is very difficult for a software supplier to get legal support in prosecuting malicious subjects. In the era of world-wide data transfer, software pirates can act from countries in which a software supplier does not get any legal support for stopping their wrongdoing. Therefore, a software supplier will in many cases be unable to enforce his license terms. A known approach for solving this problem is the integration of mechanisms in a software product, which makes it difficult for malicious subjects to create a bootleg of that software product.

A common way of realizing a protection mechanism against software, pirating is to apply a mark to the software distribution medium like e.g. floppy discs or CD-ROMs such, that it will be very difficult for a malicious subject to reproduce the mark on an illicit copy. Verification code is added to the software, which checks if the software is being run from the original distribution medium as soon as the user tries to run the software. Usually, this is done by searching the medium from which the software is being loaded for the mark that was applied by the software producer or supplier. If such a mark cannot be found, a continued program execution will be refused.

In the context of this application the term "verification code" generally refers to a piece of code and/or corresponding data contained in a piece of software that is suited to assist in protecting rights on the piece of software.

To outsmart a protection mechanism of the kind described, a software pirate can either copy the mark or remove the verification code. At copying the mark, the illicit copy is made looking exactly the same to the verification code as the original distribution medium. Alternatively, the protection mechanism can be eliminated by reverse engineering the software with the purpose of discovering the verification code and how it interacts with the remaining code. On successful reverse engineering, the verification code can finally be deactivated or removed completely. This secondly described method is generally referred to as "cracking". A "cracked" copy would not have to bear the mark, because a "cracked" version of the software would not check for its presence.

A software supplier may alternatively to the described method require an end-user to register his software product and to pay the due license fee. According to one variant of this model, a supplier will send a key file to the requesting end-user who in turn stores this file on his computer. Verification code embedded in the software will prevent, that a malicious subject can run the software without a key file. However, a software pirate can try to reverse engineer the format of the key file and generate one of his own. This is an equivalent to the copying of a mark as described above. Of course, a software pirate may alternatively also in this case deactivate the verification code from the software so that the software can be run without a key file.

Both types of attacks, copying marks or generating key files on one side and "cracking" on the other side are in wide-spread use and cannot be fully defended against. A software producer can only try to discourage any attempt of "cracking" his software by making the process of reverse engineering and other forms of attack as difficult as possible by obfuscating the inner workings of his software.

Recently, a method used to protect media like digital images and video-audio recordings has been proposed to be applied to the field of software protection. Hereby, a secret message, a so-called watermark is hidden within the software product. Due to the fact that such watermarks may only be removed easily by someone who is in possession of the hidden secret used for the construction of the watermark, this technique provides a high level of software protection.

WO 99/64973 proposes a software watermarking technique wherein the watermark is formed by a special executional state of the software. When provided with a secret input sequence, the software application enters a state which in itself represents the watermark, whereby the state is comprised of data in the stack, heap, global variables, registers, program counters and the like of the software application. In other words, the watermark is constructed within the dynamically allocated data structures of the program as it is being executed. Like above, an attacker may employ reverse engineering to identify the watermark generating code. He might then remove the generating code and thus the watermark from the software product. The suggested canonical use of the watermark is a fingerprinting of the product. Fingerprinting means, that each individual copy of the software product is uniquely watermarked, thus allowing an identification of each particular copy of a software product. In other words, by the method of fingerprinting each individual copy of the software product is watermarked with a different watermark. But still, an attack of an adversary cannot be fully defended against.

Another approach to prevent abuse of utilization regulations is to monitor the use of a software product. In this context U.S. Pat. No. 5,925,127 proposes a system, wherein a check-in/check-out module installed on a computer running the software product provides the licensing information and a software monitor module running on the same machine verifies a usage of the software program module according to the license conditions. The proposed system is especially used for monitoring the use of rented software.

The system proposed in WO 99/04354 suggests a license management system for software, wherein an application program requests a license from a license management unit which re-checks the request with a number of license decision units. In case, a license cannot be issued to a copy of an application program, this copy cannot be executed.

Although those systems check certain parameters like e.g. “Is there a license?”, “Are all licenses used up?” or “Is there an attempt to use the program beyond the expiration date of the license?”, a correct usage of the software program according to a contractual provision—part from the requirement that a license must exist at the site of the end-user cannot be guaranteed. Further, no provisions are suggested for warding off common impersonation attacks, where a malicious user sets up a fake license management unit unconditionally granting the execution of the application program, or replay attacks, where messages sent by the license management unit are recorded and later replayed for allowing an application program to execute without actually having to contact the license management unit.

Moreover, existing systems typically implement the license storage in a component that is accessible to the user of a piece of software, e.g. in the form of a software module installed on the same computer as the licensed piece of software or another computer accessible to the licensee. This enables a malicious user to attack the license enforcement mechanism by manipulating the component such, that it unconditionally confirms the presence of a license, even if no valid license exists for a certain software product.

In addition, existing protection systems typically require the programmer to add support for license enforcement, e.g. verification code, to his program manually. However, since most programmers are not security experts and hence not aware of how an attacker works, they do so in a way that greatly simplifies “cracking” their software.

SUMMARY OF THE INVENTION

It is therefore an object of the present invention to provide secure methods and systems for software distribution, protecting the rights of the software supplier and the rights of all subjects involved in a distribution process.

This object is achieved by a method for software license management and online software license enforcement comprising the steps of providing individual licenses for regulating the use of a software product, controlling a transfer of licenses, providing individualized copies of the software product for download, and monitoring the execution of each individualized copy of the software product in agreement with the individual license terms.

The above object is further achieved by a method of modifying one or more files of a software product, particularly in conjunction with the above described method for software license management, whereby the modifying is at least partly based on information extracted from at least a part of data of one or more initial and/or intermediate and/or final states of the creation process of the software product.

The above object is further achieved by a license management software program comprising the steps of providing licenses, and controlling a transfer of licenses.

Further, the object is achieved by a download control software program for providing an individual download copy of a software product by individually modifying a copy of a master-copy of the software product for download from a server according to a method of modifying one or more files of a software product as described above.

The object is further achieved by an execution control software program for linking an individual download copy of a software product requesting permission to run to a matching license, comprising the steps of obtaining identification information from the individual download copy before or while it is being executed, evaluating licenses matching the identification information, and if at least one of the licenses grants use of the individual download copy, transmitting approval to the individual download copy.

Furthermore the above object is achieved by an individual download copy of a software product created by individually modifying a copy of a master-copy of the software product for download from a server according to a method of modifying one or more files of a software product as described above.

In addition, the object is achieved by a server for providing software license management and an online software license enforcement in accordance to one of the methods described above, comprising means for the application of a license management software program, and/or a download control software program, and/or an execution control software program.

The proposed method of a provision of licenses and an individualization of the licensed software products on delivery and a further monitoring of the execution of the software products subject to a license provided, all in one system allows for one an effective control of distribution lines and beyond this ties the use of a software product to the conditions agreed to in an underlying license contract. Furthermore, it provides a high level of protection against attackers with the specific intent to circumvent the license terms by inhibiting impersonation and replay attacks and any tampering with the program code. Because licenses are provided on an individual basis, the system is able to support a variety of different licensing and distribution schemes.

Further advantageous features are claimed in the respective claims.

The individualization step advantageously includes embedding information in the individualized copies of the software product. Further advantageously, the individualization step generates a uniquely individualized copy the software product for each download. Particularly advantageously, each subject joining the procedure of software license management and online software license enforcement is subject to register prior to being granted access, so that each license can be linked to its licensee.

Modifying files of a software product preferably comprises embedding information in at least one of said files, since the embedded information is easy to locate and identify by the party that performed the embedding. The modifying is advantageously at least partly based on information extracted from at least a part of data of one or more objects files generated during the creation process of the software product, thereby allowing easy modification of files without any knowledge of the source code. In addition to that, the modifying is preferably at least partly based on information extracted from at least a part of the debug information, for debug information is comparatively uncomplicated to process and the capability of development tools to consolidate information from earlier stages of the creation process is taken advantage of. The information must not be distributed in order not to facilitate the task of an attacker, as is the case with any other data used from the final stage of the creation process. The modifying is further advantageously at least partly based on information extracted from at least, a part of the relocation information, since relocation information is in many cases by default automatically generated by the development tools. Modifying one or more executable files of the software product advantageously eliminates the need for files from a previous stage of the compilation process and creates the potential for high performance. The modifying comprising a modification of the arrangement of the subroutines and/or variables within the software product provides an advantageous means for obfuscating the inner workings of the software program. Inserting data and/or code between any two subroutines and/or any two variables within the software product raises the level of security against pirating adversaries in an advantageous implementation. Inserting data and/or code into the code of one or more subroutines within the software product advantageously makes it difficult for an attacker to separate the inserted information from the original code. Advantageously, data and/or code is inserted into the software product for testing the integrity of at least a part of the software product, to make tampering more difficult. In another advantageous implementation, the modifying comprises embedding at least a part of a piece of verification software, to relieve the developer of the software product from the burden of manually and cleverly adding verification code.

Preferably, the license management software program provides means for regulating a distribution policy for linking the provision of licenses to a distribution scheme. Advantageously, a license is provided by uploading it to the license management software. Preferably, a license is generated by the license management software when its generation is triggered manually. Advantageously, a license is generated by the license management software automatically when it is needed. In a registration procedure each subject accessing the license management software program is advantageously assigned one or more roles, so that subjects can be grouped according to their qualities. Uploading and/or enabling a generation of licenses is preferably only allowed to a subject assigned the role of a software supplier, hereby restricting the privilege to create licenses on a need-to-have basis to a limited number of—potentially identifiable—subjects, since generated licenses consume resources of the license server. Initiating a provision of licenses preferably comprises defining one or more operations on the license to model real-world license transactions, whereby further advantageously, initiating a provision of licenses comprises linking the defined operations or subsets thereof to one or more roles such, that each subject enlisted in one or more of the roles is capable of performing the operations linked to its role or roles, and the operations available to a subject advantageously further depend on attributes of the subject different from its role or roles to support more sophisticated licensing schemes. A subject advantageously may, depending on the role assigned to it, further restrict the license conditions of a license, thus e.g. allowing a further modification of the set of operations of a license available to subjects. The role assignment advantageously comprises a separately obtained verification of the subject's authorization to enlist in the requested role, like e.g. a verification by an independent trust center to protect the privacy of each licensee, whereby further advantageously, the verification of the authorization is also or alternatively based on a digital signature allowing beneficiaries of an overall contract to easily confirm their entitlement. Licenses are advantageously monitored, whereby each license holds information about the identity of one or more individual download copies of the software product licensed by this license for unequivocal identification. Preferably the license management software program suggests one or more legitimate upgrade paths leading to a license for a selected product considering the licenses already held by a subject.

The modification of the copy of the master-copy of the software product preferably creates a uniquely modified download copy for each download. Advantageously, the modification of the copy of the master-copy of the software product comprises embedding information which unambiguously links the individual download copy to a subject. The modification advantageously comprises embedding a unique identification of the master-copy of the software product from which the individual download copy originates. Preferably, the modification comprises embedding a unique identification of the individual download copy. Parts of the individual download copy, which are invariant to the different downloads, e.g. software code of the piece of verification software which remains the same for all downloads, can advantageously be kept in one or more files apart from the individual download copy so that it can be shared between various download copies of different applications.

Advantageously, the execution control software evaluates licenses matching an individual download copy on a "best snatch first"—basis, so that if more than one license is available for the individual download copy, the license restricting the use of further individual download copies by an end-user in a minimal way is chosen. An approval is preferably transmitted from the execution control software program to the individual download copy in the form of code and/or data necessary to obtain a fully usable runtime version of the individual download copy, complicating illicit copying of the software product by not providing a fully usable version of the individual download copy for persistent storage. Advantageously, the approval is a runtime ticket transmitted from the execution control software program to the individual download copy. Hereby, the expression ticket generally refers to a kind of message destined to handle permissions and which can be examined for its authenticity and integrity. Transmitting approval to an individual download copy preferably requires successful validation of a request ticket supplied by the individual download copy. Transmitting approval to an individual download copy preferably requires successful validation of its integrity. The execution control software program advantageously effects changes to be made to the individual download copy and also or alternatively to the stored tickets, which can be used to provide a method of synchronization between the individual download copy and the license server. Advantageously, the execution control software program treats the reception of a valid log-off ticket sent from an individual download copy as a notification of the termination of the execution of this individual download copy, whereby particularly advantageously the individual download copy further has to prove that its runtime version has been rendered unusable before the log-off ticket is being accepted. Preferably, the execution control software program maintains a log for each license which contains the identities of all executing individual download copies that have been granted permission to run by the license that the log is assigned to, whereby further advantageously these logs influence the replies of the execution control software program to requests for a permission to run by individual download copies Preferably, an individual download copy is a uniquely modified copy of the master copy of the software product. Advantageously, individually modifying the copy of the master copy for download comprises adding identifying information to it. Individually modifying the copy of the master copy for download preferably comprises embedding at least a part of a piece of verification code for carrying out the steps of querying an execution control software program to obtain a permission to run at a start-up of the individual download copy, and continuing an execution of the individual download copy if a permission to run is obtained and aborting the execution otherwise. Advantageously, the individual download copy notifies the execution control software of an infringement of its integrity. When the individual download copy queries an execution control software program for a permission to run, it advantageously forwards identification data. The identification data advantageously comprise the identification of the licensee. Equally advantageously, the identification data comprise the identification of the master-copy underlying the individual download copy. Preferably, the identification data comprise the identification of the individual download copy.

A request ticket is preferably supplied with a query to obtain a permission to run. Also preferably, a runtime ticket received from the execution control software program constitutes that permission to run. Advantageously, a log-off ticket is received from the execution control software program, and further advantageously the log-off ticket is returned to the execution control software program at the process of terminating the execution of the individual download copy. At least a part of a piece of verification code is advantageously embedded in one or more subroutines to verify the validity of at least one type of ticket for hampering any tricking of the ticket mechanism. Each time a subroutine of the individual download copy is invoked, a piece of code embedded therein advantageously increments a counter particular to the invoked subroutine, whereby further advantageously, the reading of each of the counters is submitted to the execution control software program at the process of terminating the execution of the individual download copy, so that the individual usage of each individual download copy can be examined. At least part of a piece of meta-verification code is preferably embedded in subroutines to verify the integrity of a least a part of the individual download copy. A provision of means for an execution of code supplied by the execution control software program advantageously enables the download copy to perform special tasks requested by the execution control software program, whereby further advantageously, a provision of means for returning a result of the execution of this code to the execution control software program enables the execution control software program to evaluate the result of the code execution.

A software license management and online software license enforcement can e.g. be implemented in a client-server-architecture like the world-wide web information system in the Internet. In this context, the term "server" relates to the general role of a computer offering services, while the term "client" refers to the general role of a computer requesting services. It has to be noted that the present invention is not restricted to an implementation in a public network, but is in the same manner applicable in an intranet.

The software license management and online software license enforcement system according to the present invention can further be implemented in a business model for providing license services to the software industry, e.g. software suppliers and software merchants. According to this business model, the services offered to a software supplier include an upload of the respective software products in addition to an upload of corresponding licenses onto the license server, and the automatic enforcement of the license regulations by the license server. Alternatively, the licenses may be generated on the server. A software supplier may hereby structure the license provision to his own convenience and by this define a distribution scheme according to his own choice. Distributors and dealers are provided by this model with a lean administration system, reducing software distribution to a virtual trading of licenses and rendering a real shipment of software on data carrier superfluous. To an end-user of a piece of software the business model provides the service of an automatic license enforcements which guarantees him juridical security by excluding any misuse of an acquired piece of software. Furthermore, license terms can easily and at any time be adapted to altered requirements on a user's side. To protect the identity of an end-user and for separating his real identity from the utilization log of the software he employs, an independent trust center is provided in this business model, which handles the validation of the roles each subject acquires in the system.

Figure 2D:
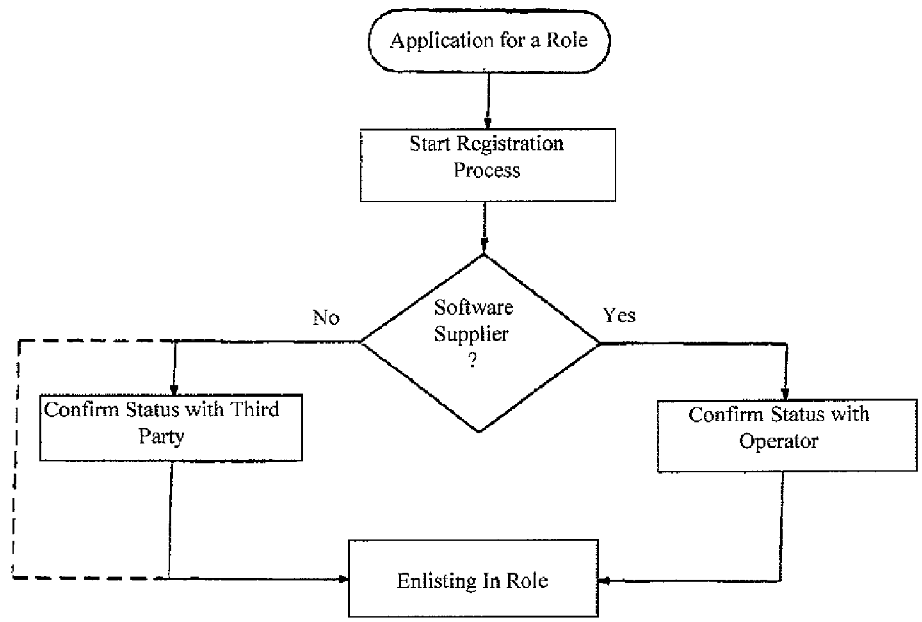
Figure 2E:
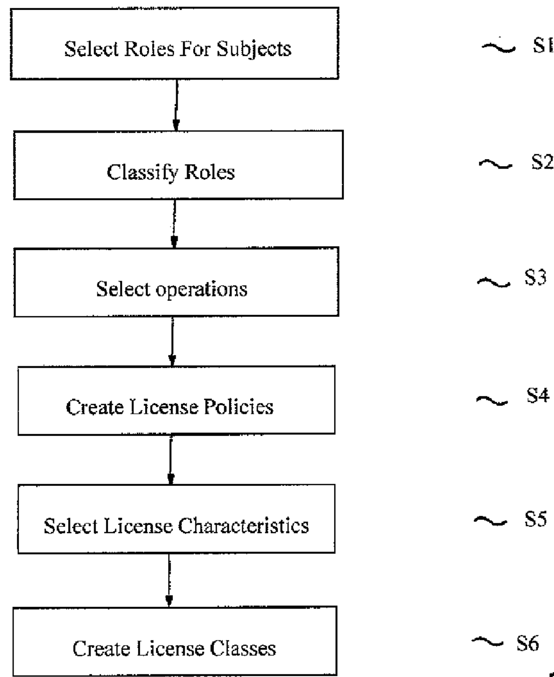
Figure 3:
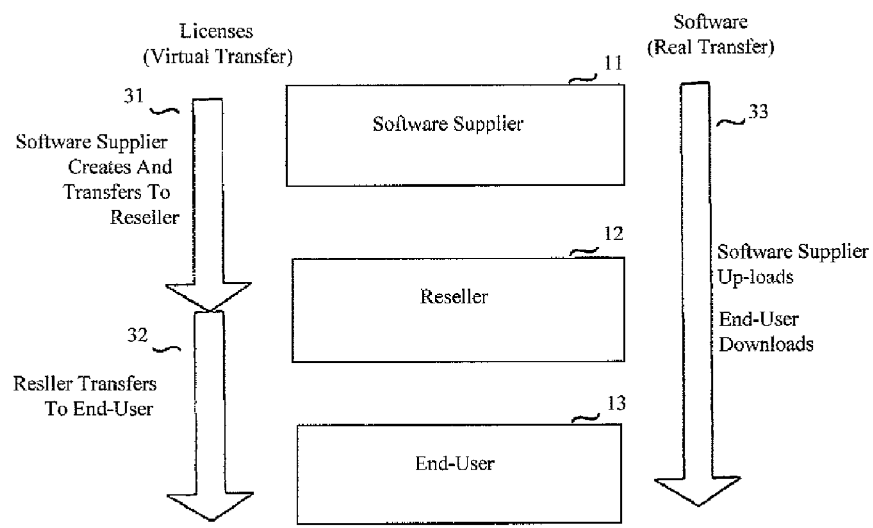
Figure 4:
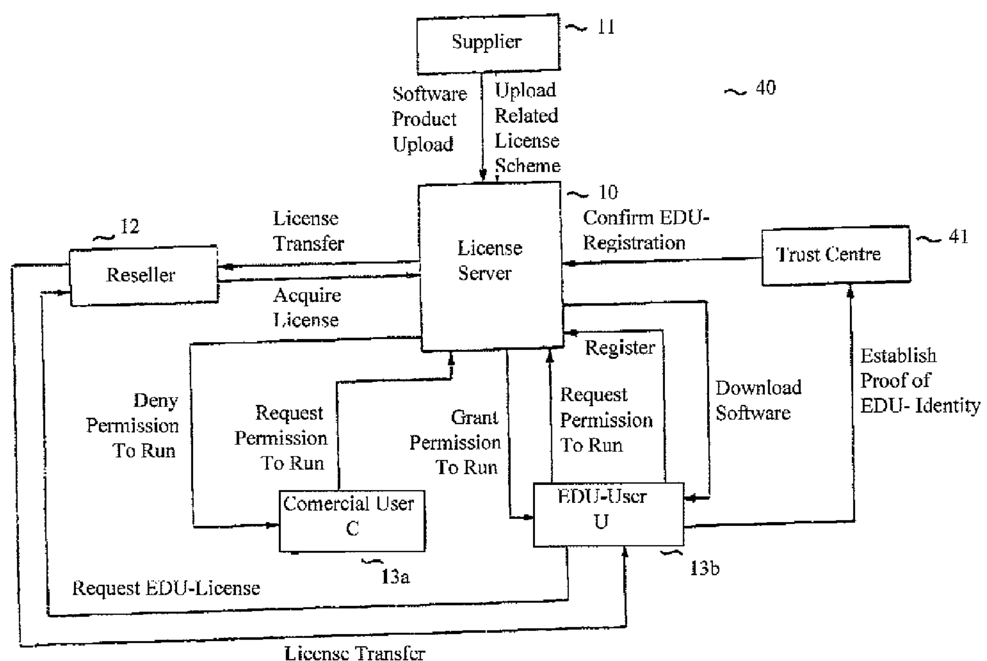
Figure 5:
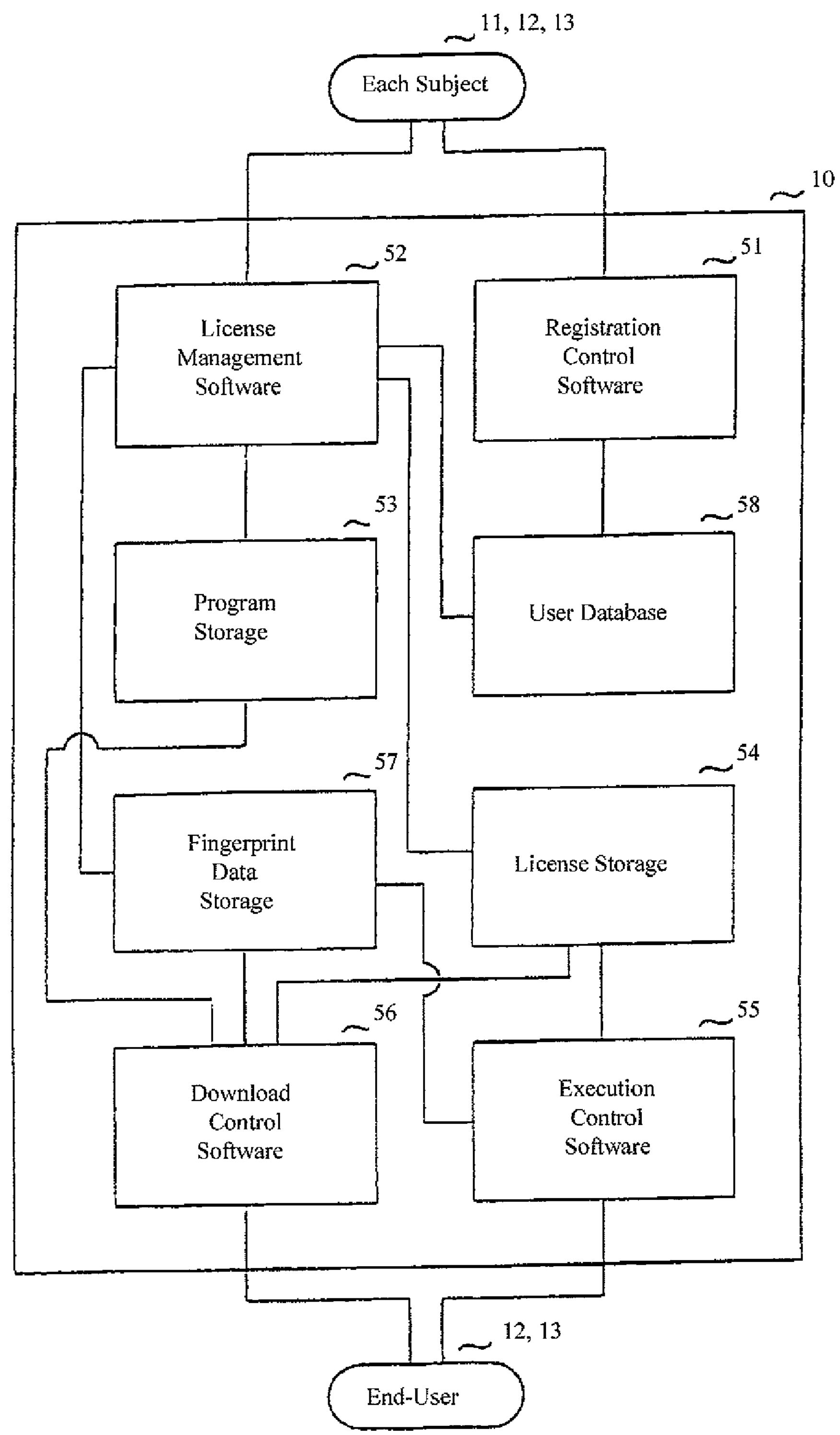
Figure 6:
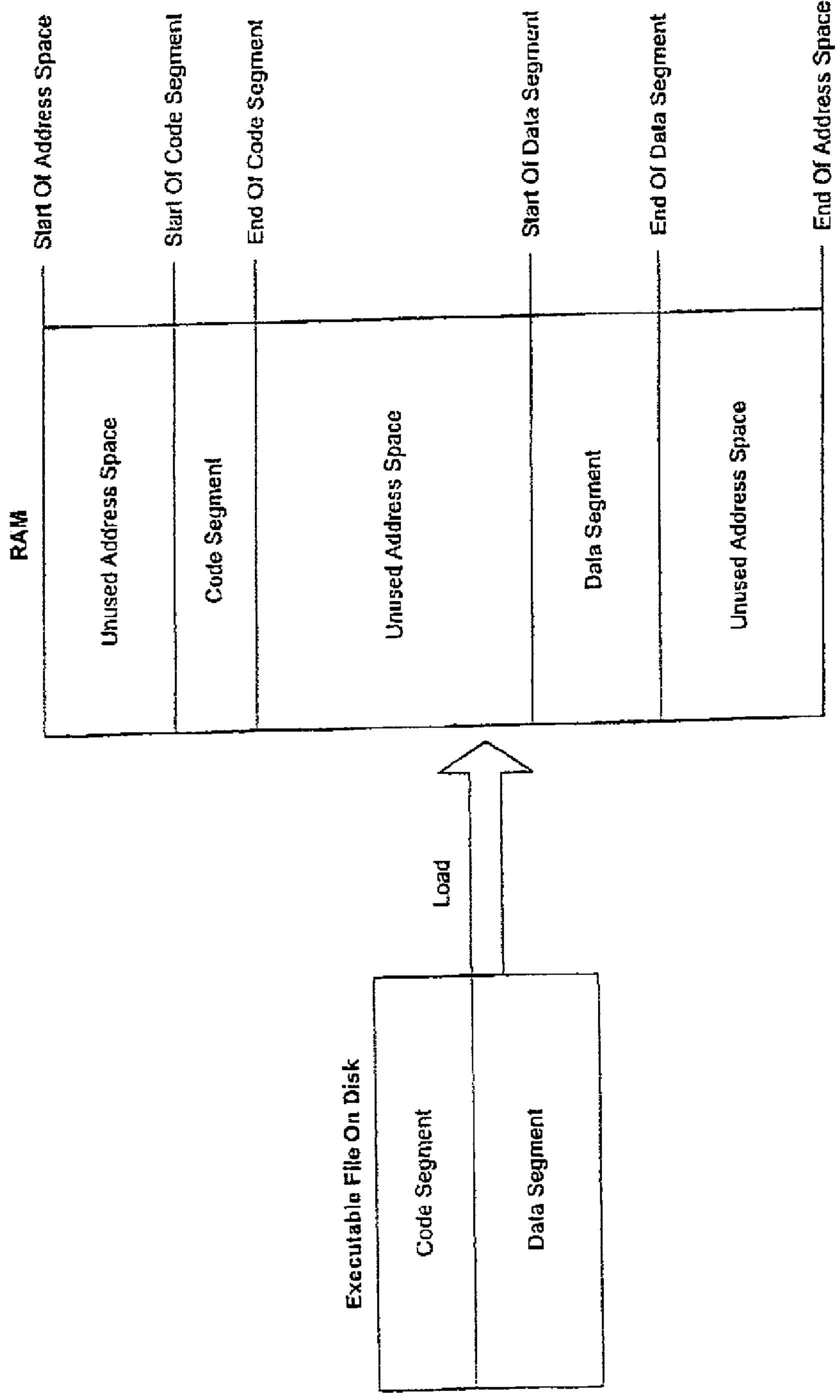
Figure 7:
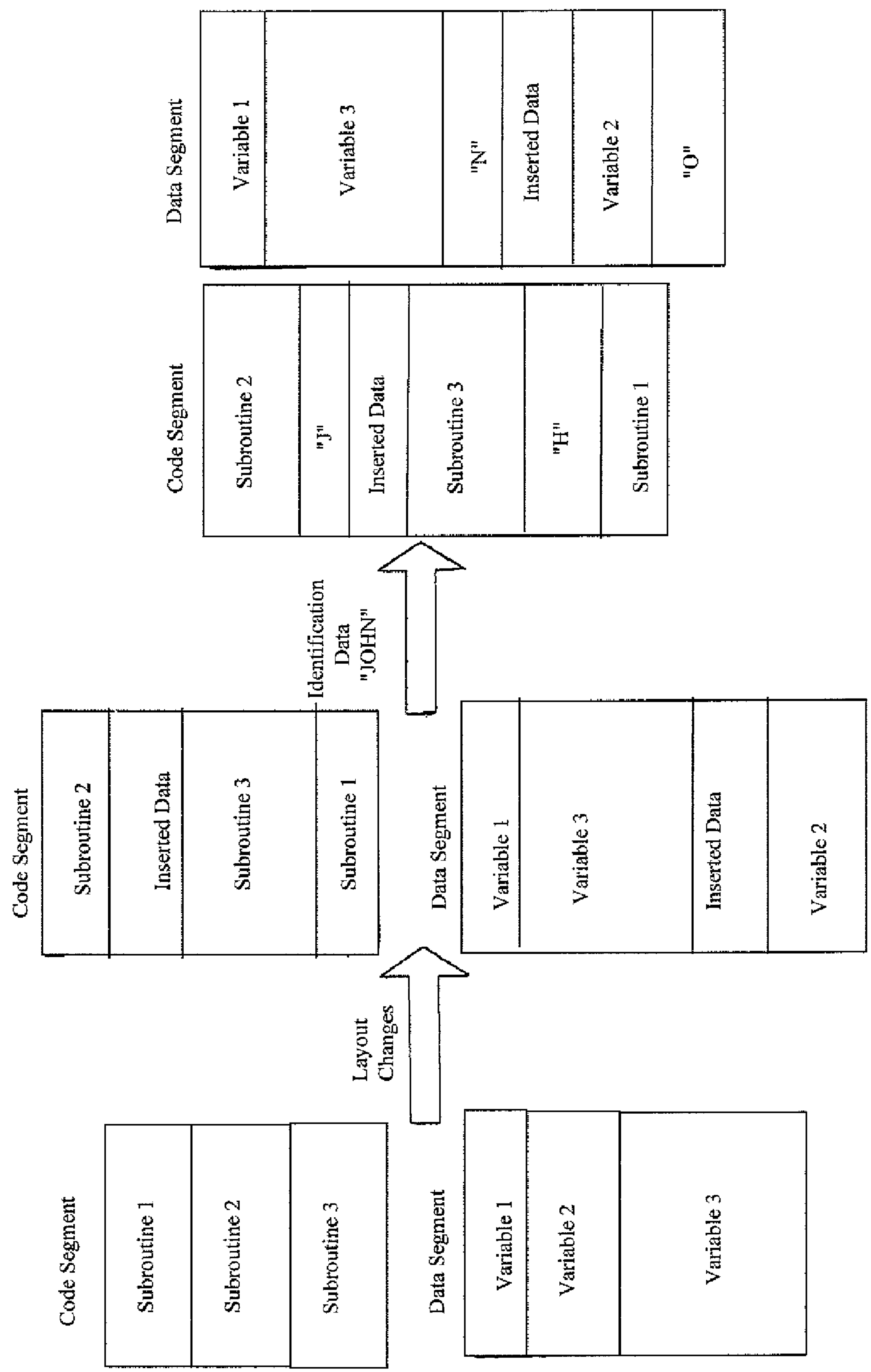
Figure 8:
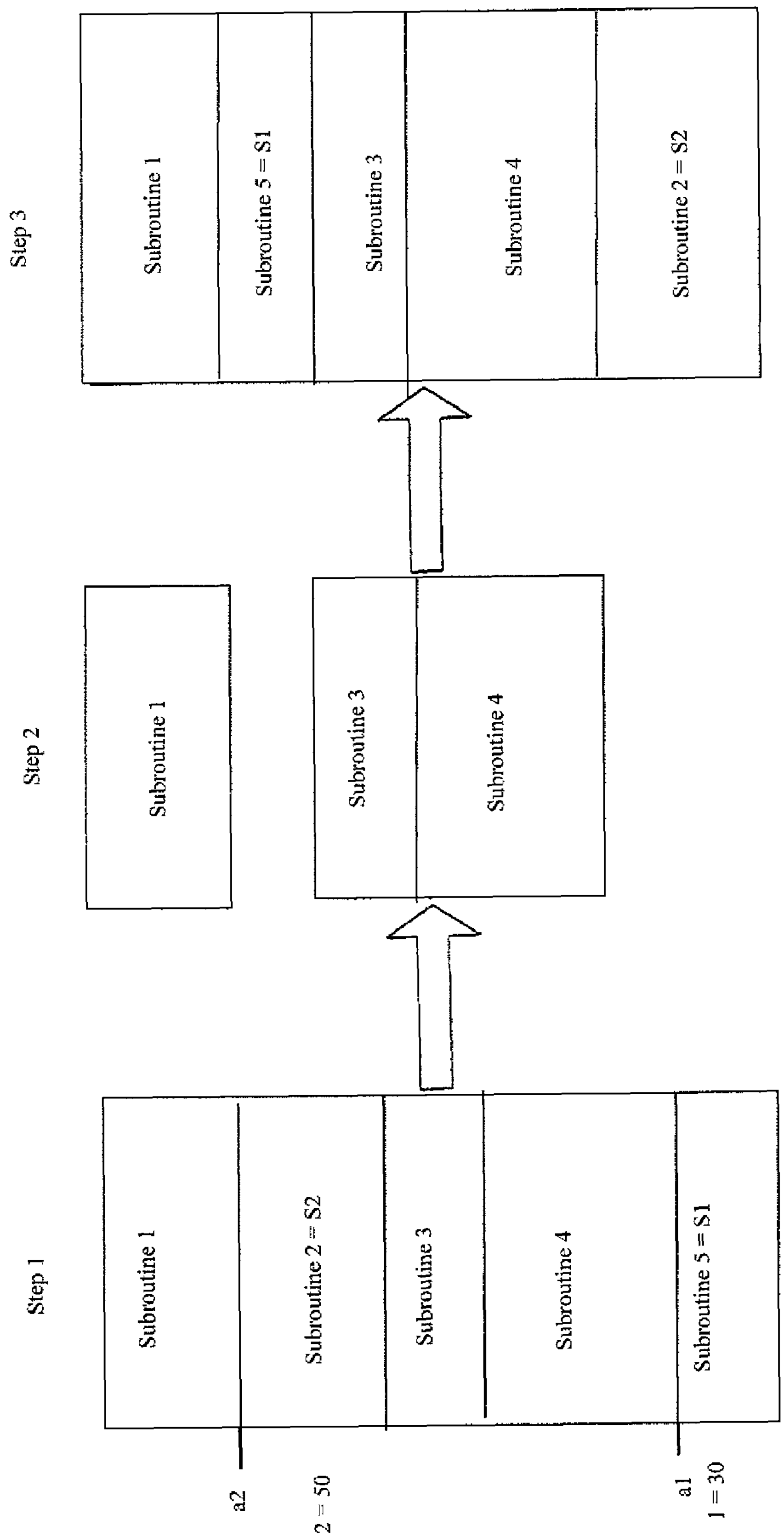
Figure 9:
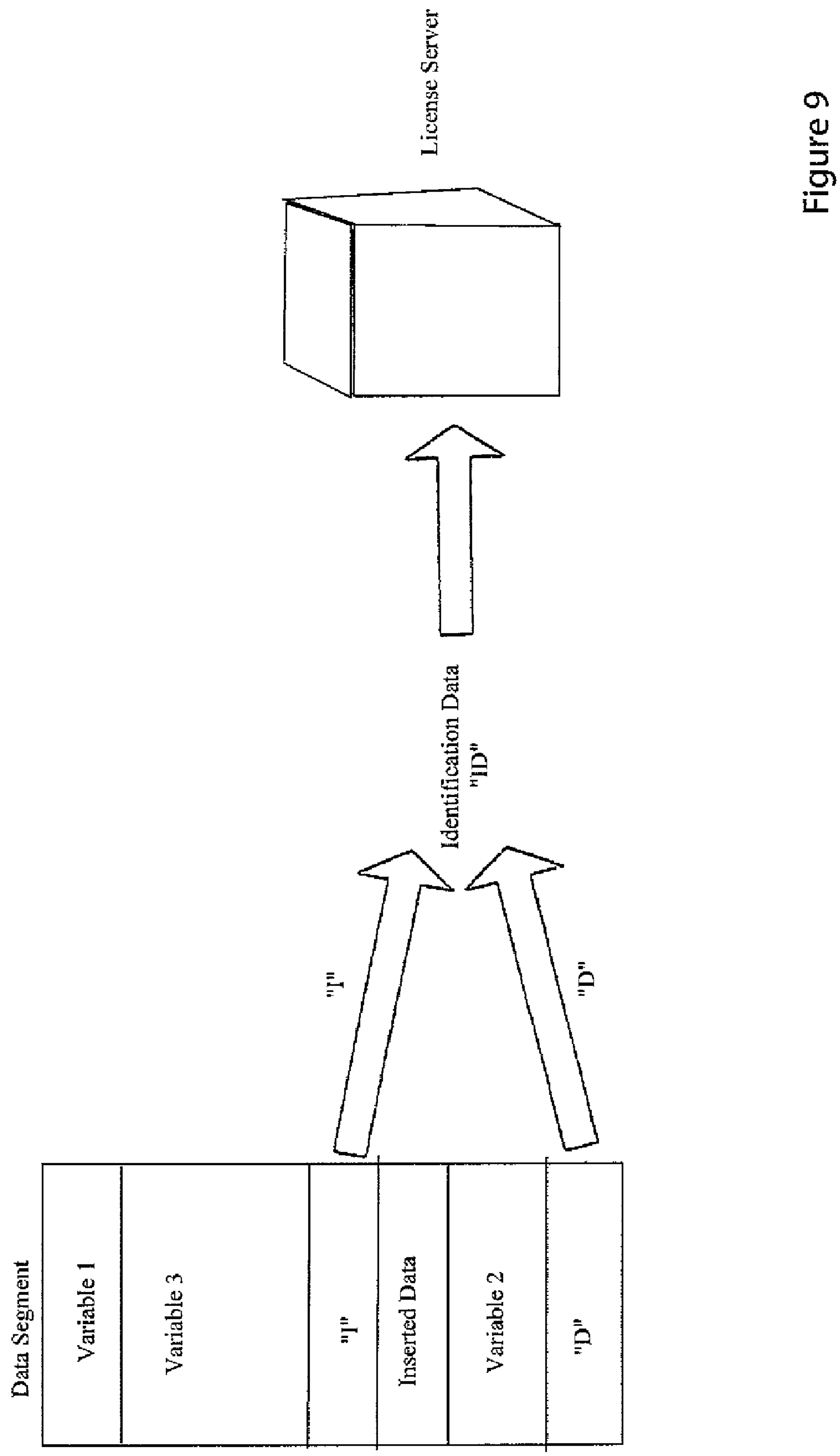
Figure 10:
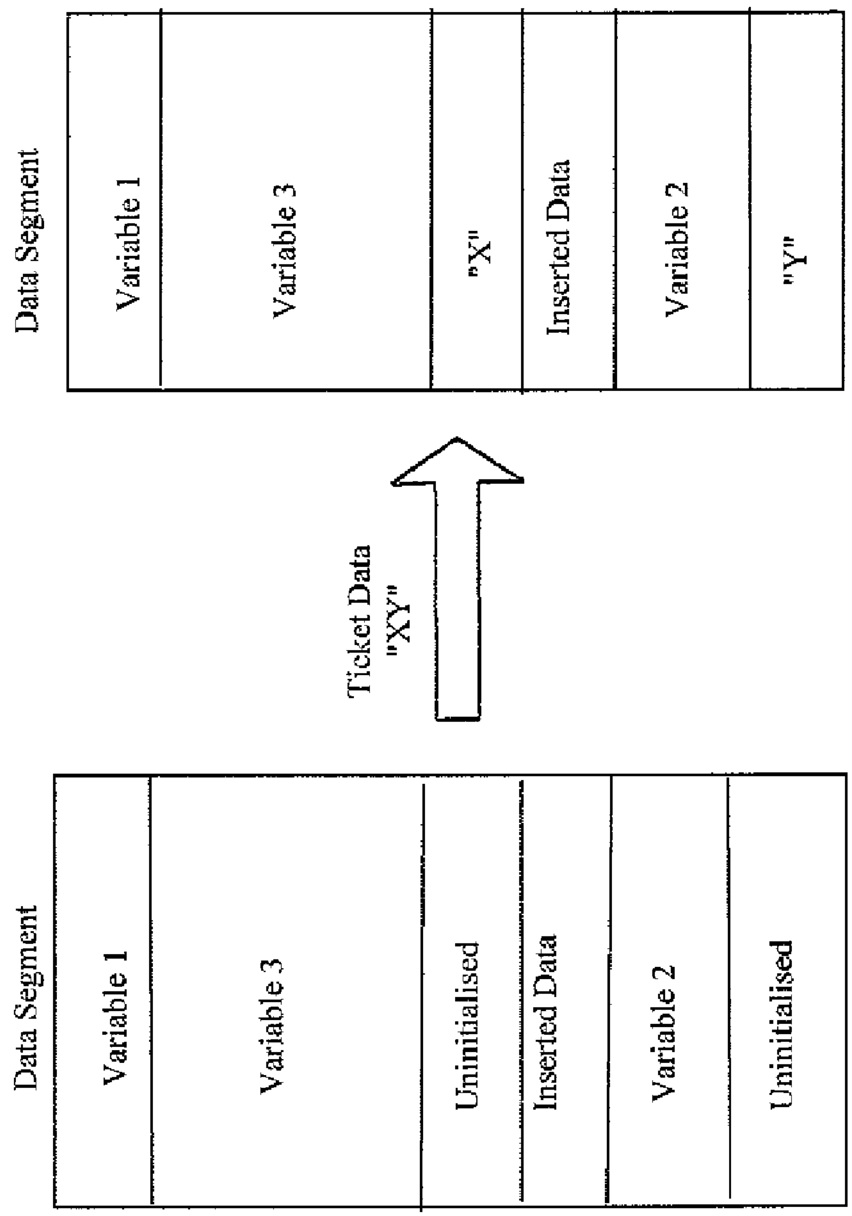

In the following description, the present invention is explained in more detail in relation to the enclosed drawings, in which FIG. 1 is a functional scheme of the software license management and online software license enforcement method according to the present invention, FIG. 2 shows an example of initiating a provision of licenses according to the present invention, wherein FIG. 2*a* is an example for linking operations to roles, FIG. 2*b* is an example for configuring license characteristics, FIG. 2*c* shows an example of a license, and FIG. 2*d* and FIG. 2*e* show the process of license configuration, FIG. 3 shows and compares the license and the software transfer according to the present invention, FIG. 4 shows a schematic of a typical scenario of acquiring a licensed software product, FIG. 5 is a block diagram of the license server according to the present invention, FIG. 6 shows the main segments of an executable file loaded into a memory when the executable is run, FIG. 7 shows an example for the individualization of an executable file according to the present invention, FIG. 8 shows the process of permutating the subroutines of an executable file according to the present invention, FIG. 9 shows the reconstruction of distributed identification data when requesting a permission to run, and FIG. 10 shows one way of inserting a ticket in a data segment.

Figure 11:
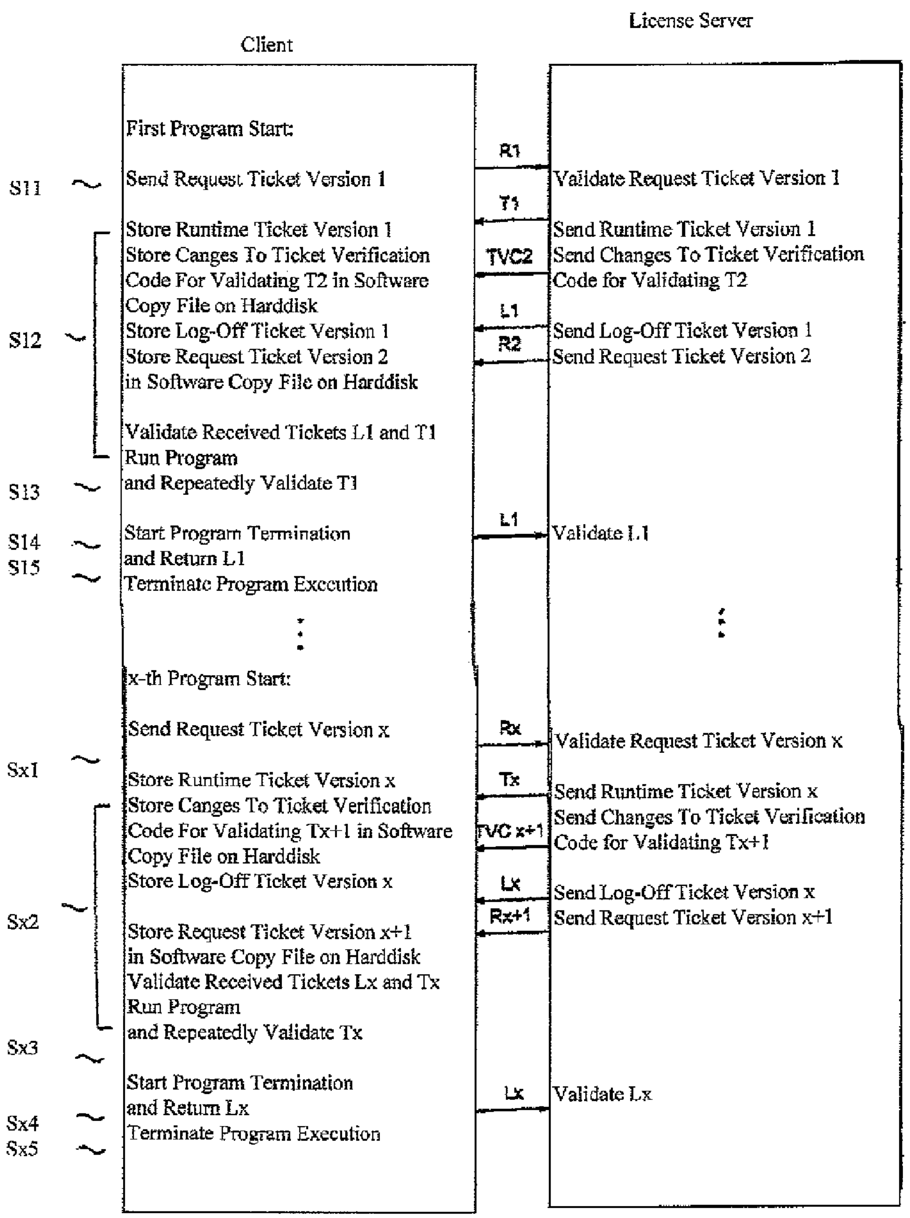

FIG. 11 shows the ticketing mechanism according to the present invention.

In the drawings, like elements are assigned identical reference numerals,

DETAILED DESCRIPTION

FIG. 1 illustrates the functions and services supplied by a license, server 10 according to the present invention to the subjects taking part in the distribution or use of a software product. The service offered to software suppliers 11 includes an upload or generation of licenses, a transfer of licenses to resellers 12 or end-users 13, and an upload of the software product to be traded with the method according to the present invention. A reseller 12 does not have to sell the software in its material form but acquires and transfers licenses to other resellers 12 or end-users 13, while the end-user 13 downloads the software himself as soon as he has acquired a license. It is to be noted that the scheme of FIG. 1 does not represent a detailed description of the processes involved, but defines the main groups of subjects, and the basic functionality provided by the license server for these groups of subjects.

Prior to being granted access to the services of the license server 10, each subject has to register. The registration procedure defines the role or roles of each subject taking part in the system and thus assigns it its basic privileges. The modes and methods of registration can be laid down by the operator of the license server 10 but additionally also by a software supplier 11. Each subject accessing the license server 10 for a first time, will be transferred to the registration where it enters all the information necessary for being assigned a membership in one or more of the basic groups of subjects, i.e. for being assigned its role or roles. For some groups a confirmation of the information entered might be necessary, whereby the confirmation usually will, be submitted on a different channel, like e.g. it could be a precondition for a software supplier to sign a contract in a written form before he can enjoy the services provided by the license server. For a dealer, submitting a copy of his certificate of registration might, be necessary as a confirmation. Very often, special types of end-users for which special conditions are offered have to prove their entitlement before they can enjoy the advantages.

The examination of the certificates proving an entitlement is in the ordinary course of things not assigned to the operator of the license server 10 nor to somebody being a member of one of the defined groups of subjects, but will usually be handled by independent trusted persons or organizations like e.g. a trust center. Under certain circumstances, particularly when student certificates have to be certified, even academic book shops or academic self-administrating organizations might take over the task. By keeping status verification separate from the license management system, the full And real identity of any subject participating in the system is kept apart from the identifying information stored in the license server.

If not already prepared by the operator of the license server 10, a software supplier 11 may further re-group the resellers 12 and/or end-users 13 for refining a given set of roles or adding new roles. Thus, he can bring the license management system of the license server into agreement with his very special preferred distribution scheme. As an example and with reference to the reselling group of subjects, the following roles may be applicable in a hierarchical distribution scheme: The role of a distributor 12, reselling software licenses to other distributors 12 and/or dealers 12, who in turn will resell these software licenses to other dealers 12 and/or end-users 13. For end-users 13 distinct roles may not only be defined for commercial and governmental end-users, but also for members of educational organizations like a university. Sometimes evaluation copies of software are provided to allow potential end-users to test the software for a limited period of time with respect to their requirements. When deciding to acquire the product later, those prospects only have to apply for a different license type. At the time a prospect asks for an evaluation copy, usually nobody will be interested in his specific role or roles. Practically, prospects may therefore be handled as anonymous end-users that do not have to provide proof of their identity, until their distinct role or roles have to be certified on buying a product.

The license server 10 does not necessarily have to be a single device as it might be indicated by the presentation of FIG. 1 but can just as well be a cluster of servers or even a system of distributed servers communicating with each other through a public network or an intranet. All subjects participating in the system access the server via a network, in a preferred embodiment of the present invention through a public network like the Internet. Advantageously, on the client side only a conventional browser software is needed to access the license server according to the present invention. By relying on standard software on the client side for accessing the server, the effort for maintaining the system is reduced considerably. The proposed central system and data management further allows dynamic changes of distribution models and licensing conditions.

A subject being assigned the role of a software supplier 11, is allowed to upload a software for further distribution to the license server 10. The software itself is not traded, which means that it does not change hands in the course of distribution, instead, the right to use the software, or to put it another way the license is traded between the different subjects.

Parallel to uploading the software, a software supplier 11 has to make sure that subjects can acquire titles to use the software. In other words, he has to provide licenses for the software. A supplier 11 can either upload licenses to the license server 10, or he can manually generate the licenses or configure an automatic generation of licenses with the help of the license management software program. Since licenses consume resources of the license server, uploading licenses or setting up a generation of licenses is a privilege conceded to software suppliers only.

Generally, subjects will acquire licenses from the license server 10 and transfer those licenses to other subjects. Thereby a license does not literally change hands because each license is kept available on the license server 10 such, that only the ownership on a license is transferred from subject to subject.

It is important to understand that a license transfer can either be initiated by the transferring party or by the receiving party. In this application, the former variant is typically implied by "X transfers to Y", whereas the latter form of initiation is explicitly stated as "Y acquires from X". Technically, however, the actual transfer is the same in both cases, i.e. the ownership of a license is moved from X to Y. If one, of the alternatives is explicitly mentioned, then the inverse direction is also possible. In both cases, X has to consent to the transaction.

When an end-user 13 has acquired a license, he is allowed to download the respective software from the license server 10. In the process of downloading the download copy is individualized and linked to its respective license on the server, so that each individual copy of a software file as well as the corresponding license can be identified at any time. When an end-user 13 runs the software, the program requests a permission to run from the license server 10 which in turn checks the permissibility of the request by examining the identity of the individualized software and the respective license. If the permission is denied, the software terminates itself and the user will not be able to run the software. Software protection is thus implemented by having the software ask the license server 10 for a permission to run each time it is being started by an end-user 13.

Software suppliers 11 offering software packages of a large volume might prefer to offer only a small but essential part of the software for download. The major part of the software is then conventionally distributed (on a recording medium like a floppy disc or compact disc together with additional material like manuals and introductory information). When an end-user 13 installs the acquired package, the installation routine will request to contact the license server to confirm the license and download the missing part of the software.

FIG. 2 provides an example of how to configure the provision of licenses with the license manager according to the present invention. Each license contains a license policy and license characteristics, which together represent the license conditions of the license. In addition, operations are defined for each license, such as transferring the license to a subject. The license policy concedes the privilege to perform one or more of these operations to subjects of different roles. A license policy can be described by a matrix of rights, in which the columns represent subjects and the rows represent operations.

On creation of a license, the license type of the license to be created is evaluated and selects the license policy to be copied to the newly created license.

In the example of FIG. 2*a*, which shows just one of an infinite number of distribution schemes configurable with the system, nine operations are assigned to eight different roles within four different license policies, i.e. for four different license types ("Educ", "Eval", "Comm" and "Deal"), thus forming four matrices of rights, each matrix representing a different license policy and hence a different license type.

In its entirety, FIG. 2*a* represents a distribution scheme by defining the relationship between the available operations and the available roles for the different license types established for a software product. The distribution scheme consists of three dimensions, namely the roles, the operations and the license types. It has to be noted that any distribution scheme may generally be represented by matrices that describe the relationship between any two of the three dimensions. Therefore, the above example could also have been represented by e.g. eight matrices for the eight defined roles, each matrix specifying the operations allowed for one role on licenses of each license type.

The eight roles made available herein for the distribution of the software, product are in detail the software supplier (Pro), who in this context acts as a provider of licenses, the distributor (Dis), the dealer (Dea), the dealer specialized in educational licenses (Dea-E), the commercial end-user (Corn), the governmental end-user (Gov), the educational end-user (Edu), and finally the anonymous end-user (Anon), who is allowed to use the software for evaluation purposes only.

It has to be understood that, for the sake of simplicity, in this example the right "Transfer to X" is to be interpreted in its technical sense and therefore controls both alternatives of initiating the transfer, i.e. the initiation of the transfer by the receiver X of the license as well as the initiation of the transfer to X by the subject owning the license.

According to the example of FIG. 2*a*, only the software supplier 11 can provide licenses of any license type, i.e. in each matrix the software supplier is the only role that is conceded the privilege to perform the "Provide" operation. The license policies in general do not allow a distributor to sell any licenses to end-users, but to other distributors or dealers, thus defining an indirect distribution system. As can also be seen, a differentiation is made between a regular dealer and a dealer for educational licenses such, that the former is not allowed to trade—i.e. neither acquire or transfer—licenses of type "Educ" and the latter is not allowed to trade licenses of type "Comm". However, both may distribute evaluation licenses (type "Eval"), acquire dealer licenses (type "Deal") and pass them to other dealers. Enforcing restrictions according to the scheme described facilitates the control of distribution channels.

Moreover, the example illustrates, that the term "end-users" refers to subjects that enjoy the privilege of performing the "Use" operation, i.e. that may actually use the licensed software product.

Reflecting a discount system, different types of end-users are defined in the given example. The most expensive license is generally the commercial license for a commercial end-user, while usually governmental organizations get discounts in the form of a governmental license. Although the role of a governmental end-users exists in the above example, the software supplier 11 chose not to create a separate license type for governmental end-users In this case, also governmental organizations have to pay the full price of a commercial license.

The budget of educational institutions like e.g. universities is very often in blatant discrepancy to their need for sophisticated technical equipment. Therefore it is common practice that the price for an educational license is only a fraction of the price for commercial end-users and even lower than the price for a governmental version. A software supplier hereby calculates on the fact that a student working in an educational institution prefers to continue his or her work with the software he or she feels already comfortable with when later working in the industry. To reduce the cost for distribution of educational software a fixed price is occasionally agreed to with a government of a state, so that members of a university of that state further only have to prove themselves being beneficiaries of the treaty to get a license "for free". Students, generally considered as being potentially broke are usually eligible for educational licenses and therefore classified as educational end-users, too. Still, technically also educational institutions and students have the right to buy a more expensive commercial license.

Finally, also dealers get special conditions for dealer licenses, which they use for marketing purposes, like presentations to prospects. In this case, also dealers become end-users.

Sometimes a prospect is given the opportunity of acquiring an evaluation license and use a software product for a limited period of time in which he is allowed to evaluate the usefulness of the software with respect to his requirements, Typically, in this situation the status of the end-user is not relevant. Hence the role of the anonymous end-user "Anon", in which subjects can enlist without having to prove their identity.

Restricting the operations available to a subject to exactly those operations that are linked to its role or at least one of its roles guarantees that each subject is only conceded the privileges proper for its role or roles. A commercial end-user will e.g. be unable, to acquire a cheaper educational license and it will be equally impossible for a dealer to sell and/or transfer an educational license to a commercial end-user.

The matrices of FIG. 2*a* further model the common practice of transferring the ownership of a license from one subject to another. In the indirect sales scheme reflected in the table, distributors can only transfer licenses to other, distributors or dealers, whereas dealers are entitled to transfer the acquired licenses to either their peers or end-users. According to the example a dealer specialize in educational licenses may sell educational licenses only to educational end-users or other educational dealers.

An end-user will typically have to register with the license server and then ask a dealer to transfer an appropriate license to him.

Sometimes, like in the course of selling a certain business division also end-users will be allowed to transfer the ownership of their licenses to a new beneficiary, who in this special example occupies a role for which higher or equal discounts are offered. The restriction is important in order to e.g. prevent a student from acquiring an educational license and then passing it to a commercial end-user.

In modern distribution schemes, the discounts given do not only depend on the roles assigned to the licensees, but also on the number of licenses ordered and/or on the number of licenses already owned, i.e. on attributes of a subject that are different from its role or roles. Still, these cases can easily be modeled within the presented paradigm by supplying a mechanism for ad hoc roles, i.e. additional roles that are temporarily assigned by the license management system to a subject typically while a matrix of rights is evaluated. If an ad hoc role Subject owning an upgradeable license of "Word Processor 1.0" existed, which was automatically assigned to each subject owning an upgradeable license for "Word Processor 1.0", a license policy enabling an upgrade from "Word Processor 1.0" to "Word Processor 2.0" could be created such, that licenses of this class would only be transferable to subjects already owning an upgradeable license of "Word Processor 1.0", i.e. subjects being assigned the ad hoc role of "Subject owning an upgradeable license of Word Processor 1.0". Therefore, to bias the end-user's decision for buying the new product from the same software supplier from whom he got the current one, a special discount can be given on the price of the new license depending on the currently used license. This is also applicable, when an end-user owns one or more software programs from one software supplier and orders additional software programs of any kind from the same supplier.

In the given example, the ad hoc role is assigned to the recipient of the license. However, to enable future extensions, an implementation of this mechanism would typically offer to consider the ad hoc role or ad hoc roles assigned to any subject participating in an operation.

Since the license management server knows about the licenses held by a subject and also knows about the license policy regulating the transfer of any license of a certain license class, it is able to suggest upgrade paths to a certain product according to the licenses already owned by a subject. If a subject having the ad hoc role "Subject owning an upgradeable license of Word Processor 1.0" asked the license management server for a way to obtain "Word Processor 2.0", the server—knowing that the ad hoc role makes the subject eligible for an upgrade license from "Word Processor 1.0" to "Word Processor 2.0"—would suggest an upgrade path from version 1.0 to version 2.0. As can be seen, ad hoc roles may also be used for purposes different from restricting operations.

Further, the license scheme may include floating licenses or even floating licenses for an assortment of different software products typically from the very same software supplier. Hereby the term "floating license" means, that a user installs the software product several times on different computers, whereby the license server just ensures that the total number of simultaneously used copies does not exceed the number of licenses bought. The term "assortment license" represents a license that allows an enduser to acquire several distinct software products, typically from one and the same supplier, a so-called assortment, from which he can use a certain number of products concurrently.

Therefore the characteristics of the licenses available within the licensing scheme have to be defined by the software supplier. The software supplier does so by creating a license class—i.e. a prototype—for each variant of licenses to be provided, A license class consists of the license characteristics as well as the license type to be used for creation of licenses of said license class. An example thereof is given in the table of FIG. 2*b*, wherein the available license classes ("EDU-1", "EDU-2", "EVA-1", "COM-1", "COM-2" and "DEA-1") for assortment licenses for an office suite consisting of "Word Processor 1.0", "Spreadsheet 1.0" and "Database 1.0" are defined. Further characteristics cover the period and the number of times for which the licensed product can be used.

If a software supplier triggers the creation of a "COM-1" license, the corresponding license class will be looked up, the license characteristics will be copied from the license class to the newly created license, the license type in the specified license class ("Comm") will be looked up and the license policy corresponding to the license type will also be copied to the newly created license.

According to the given example of FIG. 2*b* two classes of "Educ"-type assortment licenses are available for one or 50 simultaneous users. In the latter case the lifetime of the licenses is limited to 5 years. For evaluation purposes, a class of "Eval"-type licenses is defined, which will expire after 30 days or 50 program invocations, depending on what condition will be met first. The validity of the class of "Deal"-type licenses is limited to one year. Further, three different classes of "Comm"-type licenses exist, each license class having a limited lifetime of 5 years and limiting the number of concurrent users to 10, 50 or not at all.

An example of a license created for an educational end-user is given in FIG. 2*c*, granting a floating license for 50 concurrent uses of any combination of software products from the assortment containing "Word Processor 1.0", "Spreadsheet 1.0", and "Database 1.0". According to the license type and the corresponding license policy, educational end-users are allowed to use the software, and can further transfer it to another educational end-user if he desires to do so. He can use the, program as often as he likes, but the license expires five years after its acquisition in March 2001.

Instead of triggering license creation manually, the supplier may prefer to establish a set of rules to enable the license server to automatically generate and transfer licenses of certain classes in response to attempts to acquire a license of an appropriate class, if specified pre-conditions are met. The same mechanism can be used for transfer-only transactions, e.g. from a dealer to an end-user. In this example, the pre-condition would typically be the payment of the corresponding license fee by the end-user to the dealer. In most cases, the fulfillment of the pre-conditions will be verified by external means and then communicated to the license server.

In addition, it is obvious to those skilled in the art of computer programming, that performing the division of licenses into parts differently from the presented method, i.e. into pieces different from license policy and license characteristics, can be conceived. Moreover, the described license characteristics, operations and roles are only examples chosen for illustration. It is obvious that extensions to the described characteristics, e.g. a limit on the total number of program installations or role-dependent license characteristics can be realized.

By definition, operations on a license may include modifying the license policy or license characteristics, which are copied to a license on creation and thus part of it, such as conceding to or revoking from selected roles the right to perform certain operations on the license. However, care should be taken when designing a license policy to ensure that subjects cannot relax but may only tighten the restrictions imposed on a license by the license policy and the license characteristics. This typically means that subjects will only be allowed to e.g. revoke privileges from roles, i.e. to further restrict the license conditions.

It is further important to note that said modifications are carried out on the copy of the license policy or license characteristics local to a license and thus only affect the license of which the modified policy or characteristics are a part.

It is to be understood, that the example given in FIGS. 2*a*, 2*b* and 2*c* is just an illustration of the general working of the present invention and that only features relevant for the understanding of it are shown.

Each subject accessing the license server 10 for the first time has to apply for one or more roles. For some roles the status of the subject has to be confirmed separately, e.g. a distributor may be asked to send proof of his professional status. Very often, established distribution channels already exist so that the distributors and dealers are already known to the software supplier 11. A software supplier may then upload a list of distributors and dealers authorized to acquire licenses. In this case the information supplied by the distributor or dealer will only be cross-checked with the information provided by the software supplier 11. If the applicant can be found in the list provided by the software supplier 11, the applicant will be assigned the appropriate role or roles. If not, the applicant will be referred to the software supplier 11 to obtain authorization.

In FIG. 2*d* the registration process for subjects applying to use the service of the license server 10 is illustrated in a flow chart. If a subject desires to obtain membership in more than one role, the process is repeated for every role.

In an indirect sales scheme, an end-user asks a dealer for a license of a software product. The dealer will either own or order an appropriate license. As soon as the end-user 13 is registered on the license server 10, the dealer will transfer the license to him, Dependent on one or more of the roles of the end-user 13 the license server 10 will ask for a separate confirmation of an end-user's special status, e.g. a proof of him being member of a governmental or educational organization or him being a student. The confirmation will usually be handled via a third party like a separate trust center.

The acquisition of licenses can be organized in various ways. The simplest way is that the software supplier uploads a bundle of single licenses to the license server 10 which are transferred via resellers 12 to end-users 13. It has to be noted, that a transfer of licenses is not a real transfer of something physical like a sheet of paper or a file, but is simply a transfer of the ownership of the license. The license itself i.e. the information about the conditions for the use of the related software product, is kept on the license server all the time.

Usually, the means of the license management system for either manually or automatically generating licenses on the basis of a configuration provided by a software supplier according to a scheme as exemplary illustrated in FIG. 2*a* to FIG. 2*c* will be used, the pre-condition for an automatic generation typically being the payment of the license fee.

A license will not only be linked to its actual owner, but also to the information who acquired it during its journey from the supplier to the end-user, i.e, the license is also linked to the identities of e.g. the distributors and dealers involved in the acquisition process in addition to the identity of the end-user. This allows easy and effective automatic accounting that extracts the relevant information directly from the license server.

The flow chart of FIG. 2*e* shows the basic steps to be taken by a software supplier to configure the generation of software licenses for a certain piece of software. Hereby it is presumed that the link of the license configuration to the respective identity of the licensed software product is already established. In the first step S1 a software supplier selects the roles of the subjects allowed to take part in the distribution process. In case the roles provided by the license management system do not cover the roles necessary for setting up a licensing scheme according to his distribution requirements, a software supplier may define roles on his own. These roles can be made publicly available in agreement with the operator of the license server 10. New roles can hereby also constitute a certain specialization of a general role, like e.g. a new role of a dealer specializing in sales to educational end-users (Dea-E) is defined as a dealer (Dea) with only educational end-users (Edu) allowed as customers. This mechanism is similar to the inheritance mechanism known from object-oriented languages. Additionally, in step S2 the roles can be classified to define for which roles the applicant has to prove his entitlement together with the respective proof method. In step S3 a software supplier selects the operations he needs to set up his distribution scheme. In step, S4 he creates license policies and thus configures the allowance to perform an operation for each of the selected roles for each license type separately as shown in FIG. 2*a*. In step S5 license characteristics are selected as described in FIG. 2*b* and in step S6 the license characteristics and license types are combined to form license classes as outlined in FIG. 2*c*.

The example chosen shows the capacity of the license management software for designing licenses and a control of the transfer of these licenses for very different distribution schemes and for mapping even very sophisticated distribution structures herewith. But also very simple models can be established with the means for providing licenses within the license management system. To reproduce a shareware sales structure, a software supplier defines, except for his own role, only the role of an end-user, e.g. the anonymous end-user Anon. An end-user now is allowed to register with the system without separate proof of his identity. After completing registration and acquiring an evaluation license valid for a limited time, the end-user can download a copy of the software product. If an end-user decides to buy the program, he will do so by acquiring a full license, which he will get after payment of the due license fee. Payment can be accomplished using the usual payment methods established in the Internet. The end-user does not, however, have to download a new copy of the software. If the end-user decides that he prefers not to buy the software, the software will cease to work after the evaluation license has expired.

FIG. 3 illustrates the principal processes involved in a license management according to a special embodiment of the present invention. License management in principle consists of operations performed by a single subject and of interactions between two subjects. FIG. 3 demonstrates that the transfer of licenses is a virtual transfer, wherein no items are passed from one to another but rather a title on a license is transferred from one subject to another. E.g. a supplier 11 creates licenses on the license server according to one of the methods described above and the license or better the title to the license is transferred 31 to a reseller 12 on the occasion that a reseller 12 acquires the license. The right on the license is further on transferred 32 to the end-user 13. In contrary hereto, the software is transferred 33 directly from the supplier 11 who uploaded it to the license server 10 to the end-user 13 who downloads the software from the license server 10. This is a real transfer because the end-user 13 receives the software in the form of files on his hard disc.

Referring to a subject's function in the context of the operations and interactions involved in license management it may occupy one of four positions at a given time; licensor, owner, seller, or purchaser. In the process of license management, a holder of a certain role may occupy different positions, while a position may vice versa be taken by holders of different roles.

A licensor is a subject that is authorized to create licenses for one or more given pieces of software. Typically but not necessarily, a software supplier will occupy the position of a licensor.

The owner of a license is a subject that owns the license. The licensor that created a certain license typically becomes its initial owner. Ownership of a license is transferred by registering another subject as the owner of the respective license. It has to be understood that the notion of ownership in the context of this application does not necessarily comply with its legal definition. The expression "ownership of a license" denotes—in a strictly technical sense—the authorization to perform operations on the license and/or operations permitted by the license. A subject that rents a license for four weeks, for example, would therefore have to be considered the owner of the license during those four weeks.

A seller of a license is a subject that receives value from another subject in exchange for the transfer of the ownership of the respective license to the latter subject, i.e. in exchange for making the latter subject the new owner of the respective license. Analogously, a purchaser of a license is a subject that transfers value to another subject in exchange for the transfer of the ownership of the respective license to it, i.e. in exchange for being made the new owner of the respective license by the latter subject.

The whole system according to the present invention will be described by means of an example of a typical scenario 40 according to FIG. 4. It is assumed that the subjects of the scenario, a software supplier 11 (S), a reseller 12 (R), and an employee of a company 13*a* (C) are already registered with the license server. An employee of a university 13*b* (U) has to prove during the registration process, that he or she actually represents a real university and is thus eligible for educational licenses. To make sure, that the full identity of the end-user is kept separate from his licensing data on the license server and also that the use of an individual license cannot be linked with the real identity of a licensee, a trust center takes over the verification of a user's role if required. A trust center confirms the data necessary for the registration process, but is usually not able to inspect the licensing information.

The first process initiated is the transfer of licenses. S uploads to the license server a piece of software for distribution by the license server. This makes S the supplier of this piece of software. Only the supplier of a piece of software will be authorized to generate licenses for that software. The reseller R notices that the piece of software is now available and asks S for, say, ten educational licenses. S—or more likely, the license management software—generates ten educational licenses and transfers them to R. U asks R for an educational license for the piece of software. If U is registered as an educational institution, R is able to transfer the license to him. However, R would not be able to transfer one of the educational licenses to C, since C is not registered as an educational institution. Even if R were able to transfer an educational license to C, C would not be able to run the software, as will be described below. U now owns an educational license for that piece of software.

Next, the actual software is transferred by U downloading the piece of software from the license server. During the download, this particular download copy is fingerprinted with an individual watermark and thus linked to U. In addition verification code is added to the software. Further, information about the applied individual watermark is linked to the license owned by U, thus linking the license to this particular download copy.

Next, when U runs the piece of software, it asks the license server for permission to run. The license server looks up the licenses held by U, discovers that U owns an educational license, verifies that U is an educational end-user and grants permission to run. Assumed C tried to run the piece of software, the license server would then deny permission to run even if R had managed to transfer an educational license to C, because C is not registered as an educational end-user.

As can be easily seen from this example, the actual piece of software is only transferred from the license server to the end-user. Transactions between the software supplier and the resellers or among the resellers are restricted to a transfer of licenses only. More precisely, the license server transfers an ownership on a license just by keeping log of who owns which license or licenses, respectively.

FIG. 5 shows the software components of the license server 10 which in their interaction provide the method for the license management and online license enforcement according to the present invention. The registration control software 51 handles the process of assigning one or more roles to each subject participating in the system. Only subjects registered are allowed to access the license management software 52 which e.g. provides the means that a software supplier can upload his piece of software and provide licenses of the desired license classes or that licenses can be transferred. Information about each registered subject is stored in the user database 58. The pieces of software from the software supplier are kept on stock in the program storage 53. The licenses uploaded or the configuration data for the manual or automatic generation of licenses, respectively, are held available in the license storage 54 of the license server 10.

The download control software 56 checks the license data of the licensee and fingerprints a copy of the master-executable file of the piece of software, which the software supplier uploaded before, according to the license information read out from the license storage 54. The fingerprint data are stored in the fingerprint data storage 57. In addition, the license corresponding to the download is linked to the downloaded copy of the piece of software by adding a reference to the fingerprint data in the fingerprint data storage 57 to the license in the license storage 54. The actual license enforcement is carried out by the execution control software 55, The execution control software 55 receives the requests for a permission to run from the individual downloaded pieces of software via a network and determines with the information obtained along with the request and the information of the respective license stored in the license storage 54, whether to grant the permission to run, In case of a positive decision, it does so by sending approving information to the software which has posted the request. According to a preferred embodiment of the present invention, the execution control software 55 further exchanges data with the applying piece of software to check the integrity of the software copy itself and of the information obtained from it.

The download control software 56 provides an individual download copy by individually modifying a copy of the master-copy of the requested software product for being downloaded from the license server. The individualization of the download copy comprises fingerprinting the download copy and adding verification code to it. In the fingerprinting process a software watermark is added transparently to the download copy, whereby transparently means, that the watermark is information embedded invisibly to a user. The individual software watermark links the individual copy to the subject downloading it. The responsibility of the verification code is to ensure that the software can only be used if the subject owns a corresponding license, that the software code has not been tampered with, and that correct information is exchanged with the correct license server 10.

Although the license server 10 is described in the form of a monolithic device, it may be implemented as a distributed system of servers. The functionality of the license server can then be jointly realized by more than one server, each server implementing a subset of the described components.

When software is developed, this is typically done in a high-level programming language like e.g. C, C++ or PASCAL. The material result of the programming is a source code file, typically an ASCII-file of more or less cryptic representation. In generating an executable file from the source code of the software the following intermediate steps are involved, which are often hidden from the programmer by an integrated development environment (IDE). By compiling, the source code files are translated from the high-level language into equivalent assembly language source code files. This is typically done by translating each function procedure, method, etc.) of a source code file from the high-level language into an equivalent assembly language subroutine and writing the result to the corresponding assembly language source code file. Furthermore, for each variable definition an instruction is emitted to the assembly language source code file which reserves storage space for the variable and which specifies the initial value of the variable. In addition, a unique label is assigned to the storage space of the variable. This label is used to refer to the storage space of the variable, e.g. by an assembly language instruction that modifies the value of the variable. Further, a unique label is assigned to the first instruction, i.e. the entry point, of each subroutine which is used to refer to the subroutine, e.g. by an assembly language instruction that invokes the subroutine.

In the resulting file, storage space for subroutines and variables is therefore generally referenced by labels and not by addresses. Labels will only be mapped to addresses in the last step of the creation of an executable file. In the course of assembling, each assembly language source code file is translated into a sequence of bytes that represents the machine language equivalent of the assembly language source code. These byte sequences are stored in object files.

In contrast to executable files, subroutines and variables are at this stage still linked to their labels and the storage space of each subroutine and each variable is still referenced by its label. In addition, machine language instructions or locations in the data segment, for instance variables that reference a subroutine or variable are marked. These are the two major differences between object files and executable files. In all other respects the byte sequences in the object files are already very similar to the byte sequences found in the code segment of the executable file generated from the object files.

On linking, all object files are combined into a single executable file. Each subroutine is assigned individual storage space in the code segment of the executable file to provide room for the byte sequence representing the subroutine. In addition, the byte sequences are copied to the appropriate locations in the code segment of the executable file.

Further, each defined variable is assigned individual storage space in the data segment of the executable file. In addition, the initial values for all initialized variables are written to the appropriate locations in the data segment of the executable file.

FIG. 6 shows the basic components of an executable file, the code segment and the data segment. When loaded into the memory of a computer the code segment and the data segment are stored at different locations, whereby both segments may be separated by memory address space not used by this executable file.

The code segment represents the instructions that a piece of software consists of, i.e. it contains a representation of the employed algorithms in machine language form, which can be directly run by a microprocessor. Typically the code segment consists of subroutines, which are the direct machine language equivalent to functions, procedures, methods or similar constructs that a high-level programming language offers. Each subroutine implements a subset of the total functionality of the software and may invoke other subroutines.

The data segment stores the data that the instructions in the code segment operate on, i.e. it contains storage space for each variable used by the implemented algorithms.

In the process of linking the object files to a combined executable file a linker replaces all references to subroutines and variables by the actual addresses of the subroutines and variables, in other words it resolves the references. It can do so very easily, because all locations that reference subroutines or variables are marked in the object files as stated above. On demand, the linker also produces a map file, which lists the mappings of all subroutines and variables to their respective addresses.

At this point the layout of the code segment as well as the layout of the data segment is determined. The storage space for each variable and each subroutine is now located at a fixed address. Subroutines and variables can now be referenced by their respective addresses, which is the only way of referencing storage space that is supported by typical CPUs.

It is important to note that while moving forward from the initial representation of the software program towards the executable version of the software program as described above, much of the information about the software program which is not needed to execute the corresponding executable file, e.g. information about the exact layout of the data segment, is lost.

The basic principle behind fingerprinting according to the present invention is to link to a licensee a unique executable file derived from a master-executable file by changing the layout of the executable file and/or inserting identification data specific to each licensee into the code and/or the data segment of the executable file.

In addition, further obfuscation techniques may be applied to discourage attacks based on comparing two differently fingerprinted files, e.g. exchanging an instruction and its predecessor, if it does not depend on the result provided by its predecessor. In general, transformations modifying the software program but preserving its semantics are employed.

An example is shown in FIG. 7. The original master executable file is composed of a code segment comprising subroutine 1 to subroutine 3 and a data segment with the variables 1 to 3. In a first step the layout of the executable file is altered by pseudo-randomly permuting a sequence of subroutines in the code segment and further inserting arbitrary data at pseudo-randomly chosen locations between any two subroutines or variables. In a second step the variables of the data segment are permuted and further additional arbitrary data are inserted into the data segment at pseudo-randomly chosen locations between any two variables. In the last step identification data specific to the licensee are inserted into both segments of the executable file. In the example of FIG. 7 the identification data are a sequence of bytes representing the word "John". The identification data is split up into several sub-units like e.g. into the letters forming the word John and each of the sub-units is inserted at pseudo-randomly selected locations between any two subroutines or variables of the executable file.

In order to find the inserted data when examining a fingerprinted file, methods are known to those skilled in the art of watermarking that do not require knowledge of the locations of the inserted data, e.g. implicitly addressing the inserted data or secretly marking the locations of the inserted data.

To further increase the robustness of the applied watermark, in a special embodiment of the present invention additional functionality—i.e. additional code—is embedded into existing subroutines. The task of this functionality is to make sure that the identification data has not been tampered with. E.g. checksums may be used to verify the integrity of the identification data. Another possibility is to store the same byte of identification data multiple times at different addresses. The additional code then checks whether the identification data stored at a first address contain the same data as the identification data stored at a second address. If the data are not found to be identical, program execution may be hampered or the license server will be informed that the download copy has been tampered with.

It has to be noted that the expression "embedding code" typically implies that at least part of the data that the embedded code operates on is also embedded or that storage space for data stored by the embedded code is created.

Software suppliers very often hesitate or to be more precise refuse to disclose the source code or to make the object code files of their software available. Therefore in many cases fingerprinting and the insertion of verification code has to be carried out on executable files exclusively. In addition, modifying an executable file is considerably faster than linking, which would have to be done if the fingerprinting was done on the basis of object files. However, since information is lost during the process of generating the executable file, e.g. references are not marked in executable files, it is difficult to discover all references and thus generate a modified but still working executable file.

Therefore, to be able to perform modifications such as the modifications described above, information from one or more earlier stages in the generation of the executable file, i.e. a stage in which the necessary information is still available, has to be extracted. In particular, the linker could also produce a map file, from which the mappings of all subroutines and variables to their respective addresses could be determined. In addition, information about the marked locations in the object files that reference variables or subroutines could be extracted from the object files. The length of variables could typically be determined by examining the corresponding object or source code files.

Since the described loss of information also impedes the debugging of an executable file, most software development tools provide the option of extracting information about the layout of the code and data segment, variable names, variable types, the line number of the line in the source code file that corresponds to a certain memory address of the code segment, etc., and store the information in debug information files along with the executable file to facilitate the debugging of the executable file. So, the necessary information for performing the modifications can also be automatically propagated to a final stage of the generation of the executable file—if supported by the employed software development tools—and be extracted from that stage, e.g. from the debug information. Since the information is a valuable aid in reverse engineering and analyzing an executable file, it is typically not distributed with the executable file, although it is a part of the final stage of executable file generation.

In addition, the debug information may be embedded in the executable file instead of being stored in a separate file. However, before distribution, this information is typically removed from the executable file.

Moreover, some executable file formats provide means for storing relocation information. Relocation information consists of a list of all memory references in the code segment or data segment of the executable file. As stated above, references are resolved and memory addresses are assigned at link time. Yet, knowing all memory references, the code segment and data segment can be loaded and stored in memory starting at arbitrarily selected base addresses, be adapted to the selected base addresses by adjusting all memory references accordingly, and finally be successfully executed in the chosen memory area, independent from the addresses chosen at link time. Extraction of information concerning memory references from the relocation information is therefore also possible.

In the canonical implementation, the extracted information is transmitted to the license server along with the executable file in the form of a simple ASCII file. It contains the information of the address of the beginning of each subroutine in the code segment and the start address of each variable in the data segment. If the length of the subroutines and variables are not supplied, they can be calculated by the differences of the starting addresses of two adjacent subroutines or variables. The information about the marked locations contains a list of all references from the code segment to any of the subroutines as e.g. generated by subroutine calls or jump tables, and to any of the variables as e.g. generated by parts of the code that accesses a variable, It further contains a list of all references from the data segment to any of the subroutines as e.g. generated by pointer variables that point to a subroutine and to any of the variables as e.g. generated by pointer variables that point to a variable.

The information about the marked locations and the layout of the code segment and data segment meet the necessary requirements to apply complex modifications to the master executable file and insert information into the code or data segment. In addition, the information is helpful in analyzing the code forming each subroutine as well as the relationship between subroutines.

It is to be understood that the information mentioned above is just a simple example of the information being transmitted to the license server. In a real-world application, different or additional information about the executable file may be transferred.

An example of a permutation of subroutines by an algorithm according to a preferred embodiment of the present invention is shown in FIG. 8. At first, two randomly chosen subroutines S1 and S2, located at the addresses a1 and a2 with a respective length of 11 and 12—i.e. "ell-one and ell-two" and not "eleven and twelve"—are selected. Next, the subroutines are saved by for instance saving 11 bytes starting with the address a1 and saving 12 bytes starting from the address a2. In the special case that the length of both subroutines is equal, the saved subroutine S1 is stored beginning with address a2 and the saved subroutine S2 is stored beginning with the address a1. To swap the subroutines when the lengths differ, the block of subroutines separating the two is shifted towards the address of the longer subroutine. Assumed that the length 11 of subroutine S1 is shorter than the length 12 of the subroutine S2 and further that originally subroutine S1 is located at a higher address a1 than subroutine S2 then the block of subroutines separating S1 and S2 is moved upwards (with respect to the representation of FIG. 8) into the direction of the lower address a2 by 12–11 bytes. The saved subroutine S1 is then stored beginning with the address a2 and subroutine S2 is stored beginning with the address a1–(12–11).

In case subroutine S2 is stored at a higher address than subroutine S1, the block of subroutines separating the two is shifted downwards (with respect to the representation of FIG. 8) into the direction of the higher address by 12–11 bytes.

Subroutine S1 is then stored beginning with the address a2+(12−11) and subroutine S2 beginning with address a1.

Assumed subroutine S1 is longer than subroutine S2, then the procedure is in principle the same with the only difference that the subroutines separating the selected ones are just shifted the other way around. E.g. if subroutine S1 is stored at a lower address a1 than subroutine S2, the block of subroutines between the two to be permutated is shifted upwards to a lower address by a value of 11−12 bytes, and in case the subroutine S1 is stored at a higher address than subroutine S2, then the block of subroutines separating the two has to be shifted downwards to a higher address by 11−12 bytes. In the first case, S1 will then be stored beginning with the address a2−(11−12) and subroutine S2 will be placed beginning with address a1. In the second case S2 will be stored at the address a1+(11−12) and S1 at the address a2.

The permutation of the variables in the data segment is performed in exactly the same way. By permutating the subroutines and the variables, the references to and from the subroutines and variables no longer continue to be correct. Therefore, the permutation algorithm has to adjust all references to the new order in the sequence of subroutines and variables. It can do so very easily, since it is in possession of e.g. the information about the locations marked in the object files.

Like mentioned above, fingerprinting the executable file can also include the insertion of data between any two variables and/or subroutines. To embed a sequence of a number of bytes, the algorithm proceeds according to the following scheme. A subroutine or variable after which one or more bytes of the sequence will be inserted, is picked out randomly. All subroutines or variables, respectively, located at higher addresses than the selected one are then moved towards higher addresses by the number of bytes to be inserted. This creates a gap behind the chosen subroutine or variable comprising an appropriate number of bytes. Next, all references concerned are re-adjusted. Again, this can be accomplished, because e.g. the information about the marked locations is known from the object files. At last, the chosen bytes of data are copied into the gap created previously. This procedural sequence is repeated until all bytes of the sequence of bytes are stored within the executable file.

To covertly verify the integrity of the embedded information, and thereby improving the ruggedness of the fingerprint against attacks by a malicious subject, pieces of code are inserted into several subroutines that verify the integrity of the embedded information. According to one preferred embodiment, checksum data are added to the information to be embedded and the embedded code then calculates the checksum of the embedded information and compares it with the embedded checksum data.

Alternatively or additionally, parts of the embedded information are embedded redundantly multiple times at different locations. The code embedded in a subroutine will then load one of the redundant values and compare it with the value from a different location and so on, until the identity of the redundant information from the different locations has been verified. If a mismatch is found, the program may be made to loop forever or crash. Especially in this case, it is made very hard for an attacker to control the success of his "cracking" efforts. The code will only run, when the subroutine it is embedded in is invoked by a program function. Assumed, that a malicious subject misses only one of the pieces of information, then the program will run on the first try but when it calls a certain function which invokes the subroutine with the embedded code, the program will freeze or crash. To be successful, an attacker would have to find all checksums and all instances of the embedded information for being able to outsmart the embedded code.

As a result of inserting code, the corresponding subroutine grows in size. Therefore the layout of the code segment has to be changed. Assumed, that an existing subroutine S3 located at the address a3 will receive verification code of one of the above discussed kinds. First, the extra number N of bytes needed is calculated, whereby N represents the length of the machine language instructions of that verification code. All subroutines located at higher addresses than a3 are then moved towards higher addresses by N bytes. Subsequently, the modified version S3* of S3 containing the additional verification code is then stored beginning with address a3. Finally all references to the offset subroutines are adjusted. Again, this is easily possible, since the information extracted e.g. from the object files is available.

The security of the described method relies on the fact that an attacker is only in possession of the executable file and does not have access to the extracted information known to the license server. Therefore, care must be taken not to leak information to an attacker and thus not to distribute the parts of the final stage of program creation from which the information has been extracted. Thus, safety procedures typically include at least removing debug information or relocation information from executable files and not distributing debug information files or object files to end-users.

It is obvious, that distributing data from an initial or an intermediate state of program creation can also facilitate the work of an attacker. However, data from these states is normally not distributed anyway. Hence, this has not been explicitly mentioned.

It has to be understood that the described method may further be used to lift the burden of manually adding verification code to a piece of software from a programmer by adapting the mechanism to embed one or more pieces of code—i.e. in particular verification code of any kind—and/or corresponding data into the software product.

In addition to executable files, the embedding method can also be applied to other representations of the software product, e.g. object files.

In a further embodiment of the present invention not only identification data are inserted between subroutines but also one or more additional subroutines will be added to the existing ones. These subroutines will then generate the identification data when being invoked. The result will either be checked instantly by the calling subroutine or be stored as a variable in the data segment. For this purpose storage space for one or more additional variables in the data segment will be created in the process of fingerprinting. As an alternative to adding additional subroutines for the generation of identification data between any two subroutines, the code can also be embedded by one of the above described methods within one or more existing subroutines. Like for any of the obfuscating methods described above, this process has to be concluded by performing the necessary adjustments to all references to addresses in the code segment and the data segment, to reflect the modified layout of the code segment and the data segment.

To further obfuscate the layout of the download copy, the fingerprinting may include an embedding of non-functional code into randomly chosen subroutines, so that subroutines can no longer be tracked down by comparing different download copies of the same software product.

It has to be understood, that transformations different from the transformations mentioned above are conceivable, sharing the common property of examining the previously extracted information. The transformations that can thus be created have a much higher potential for complexity and are thus typically better suited to defend against attacks than transformations that do not have the extracted information at their disposal.

Fingerprinting each individual download copy in the above described manner makes the licensing mechanism resistant. to attacks with “cracks”, small and simple programs for automatically removing, bypassing or outsmarting a licensing mechanism or copy protection in a software product. These “cracks” can be downloaded for many software programs from various web pages in the Internet. Their success is based on the condition, that all copies of a software program are identical, so that only one general “crack” program is necessary to disable the licensing mechanism of every copy of a certain software product. Due to the fact that a method to circumvent the protection mechanism for one download copy by successfully removing the verification code of the license enforcement and/or the watermark will not be applicable to any other download copy, because according to the present invention every copy is modified individually, such a general “crack” program will fail to circumvent the built-in license verification.

In an alternate embodiment of the present invention which is especially suitable for larger software packages only a small but important part of the program code is uploaded to the license server by the software supplier while the major rest of the software package is delivered to the customer in a different way, e.g. conventional media like CD-ROMs. Since the larger part is of no value without the smaller part that the customer downloads from the license server a secure software protection will also be guaranteed for this case.

The code embedded into a download copy as described above may also be classified as verification code. In addition, two further kinds. of verification code are typically embedded in a download copy in the course of the fingerprinting process, resulting in embedded verification code that serves three main tasks. As discussed above, the verification code has to verify the integrity of the watermark applied during fingerprinting and to prevent tampering, and thus increase robustness of the software watermark against attacks. Further, the verification code checks the integrity of the individual download copy to discover any modifications done to the original code and/or data. This part of the verification code guarantees the tamper-resistance of all built-in mechanisms. When abuse is detected, the license server could be informed of the misdoing and then generate an alert so that the incident can be investigated. Alternatively, the executing program can be made to freeze or crash if modifications are, detected. The third task of the verification code is querying the license server via a network in order to obtain permission to run and to stop program execution in case the permission is denied due to a lack of an appropriate license. This runtime mechanism of the verification code is called license enforcement. In the process of downloading the software from the license server the code for the license enforcement varies slightly between any two distributed pieces of software, i.e. it will work slightly differently and will be embedded at different positions in the code.

It has to be understood that any data contained in any download copy—i.e. in particular code embedded in any download copy—which is identical for different downloads may be supplied and stored separately and thus be shared between more than one download copy.

A general idea of license enforcement is to add appropriate verification code to a piece of software that, when the piece of software is stared, queries the license server via a network, preferably the Internet, and requests permission to run. This allows an unprecedented flexibility in the handling of licenses, because modifications in the license conditions and/or the number of licenses affected by a user employing a browser-based license management interface, are immediately reflected by the execution control mechanism on the license server. The examination of a request for a permission to run will always be carried out on the current status of the licensing conditions of a licensee. According to a special embodiment of the present invention the license server is constantly aware of all licensed programs that are running at a certain point in time. For this purpose the license enforcement, part of the verification code contacts the license server once more when the user exits the piece of software thereby notifying it of the termination of the program.

This online license enforcement is considerably more resistant to “cracking” than a conventional off-line protection method explained above. To break the protection mechanism, an attacker would have to find a way for modifying the software such, that it becomes usable without contacting the license server. Apart from obfuscating the inner workings of the software and to hide the verification code that interacts with the license server, in an especially advantageous embodiment of the present invention the user is provided with a copy of the software executable file, which lacks important parts of the code or has been rendered unusable in a different way. The missing pieces or information for repairing the unusable copy of the software are then automatically downloaded from the license server each time a permission to run is granted.

Additionally, a lesser degree of protection can still be achieved even in off-line scenarios by only employing the fingerprinting method described above to link an individual copy of a piece of software to the subject acquiring the copy. Thus the subject will be discouraged from illegitimately distributing bootlegs of his or her copy.

The verification code for license enforcement consists of three sections, a start-up verification code responsible for asking the license server for a permission to run, a permission validation code constantly checking the authenticity of the permission to run either explicitly or implicitly, and a shut-down verification code responsible for notifying the license server when the execution of the running piece of software has been terminated.

It has to be understood that the embedding of any code or data needed for license enforcement can easily be performed using the same techniques that are employed for fingerprinting.

When the start-up verification code queries the license server, the request contains identification information which has been invisibly embedded by the license server into the piece of software during download. The identification information transmitted along with the query typically contains a unique identification of the licensee, a unique identification of the software product, like e.g. “word processor XYZ, version 3.2” and a unique identification of the individual download of a piece of software that requests permission to run, like e.g. “download 121972”.

It is obvious that instead of transmitting three pieces of identifying information a single piece, e.g. a single identification number like “720201”, can be sent to the license server, if the license server maintains a mapping from all single identification numbers to the corresponding pieces of original information. In the given example, the server would map the identification number “720201” to the triplet (licensee, “word processor XYZ, version 3.2”, “download 121972”).

In principle the identification of the licensee can be of any End like for instance his or her mail or e-mail address, but in case an increased level of privacy is desired, a pseudonym will be used instead. The pseudonym typically is a customer number or a customer code. Preferably, the information for mapping the pseudonym to the real identity of the licensee is only available to a trusted third party. By this means, the usage pattern for the license software is separated from the identities of the licensees. The third party like e.g. a trust center will not be able to access the usage pattern for a licensed software and the operator of the license server will not be able to access the real identity of a licensee. Thus the rights of licensees are protected.

The identification information allows a flexible enforcement of a plurality of licensing models A software supplier may offer different varieties of the same type of software but with graded functionality. Depending on the scope of the program functionality different licensing models may be employed. The licensing model according to the type of software is then identified by the identification of the piece of software asking for a permission to run. The identification of the individual download of a piece of software is used to discriminate between different installations of the same piece of software which have been made by the same licensee.

Assumed, the licensee is a small company which owns a license to use the software package "word processor XYZ, version 3.2" a maximum of three times simultaneously. The system administrator however has downloaded and installed the word processor five times, one copy on each one of his five desktop computers. Because the company owns a floating license, it is allowed to use the word-processor on each one of the five desktop computers, but not on more than three at the very same time. In the case of this floating license, the license server could choose to only consider the identification of the licensee and the identification of the piece of software and would then grant a permission to run as long as the software is not running more than twice at the site of the company. If the maximum of running copies of the piece of software was already reached, the license server would deny a permission to run a further copy.

If the license is bound to a particular copy of the piece of software the license sever will check on receiving a request to grant a permission to run, whether the individual download copy of the piece of software is already reported running. Assumed, the license server receives a request for "download 121972" of "word processor XYZ, version 3.2" and detects that the "download 121972" is already running it will deny the permission to run. Most probably, the licensee must have made an illicit second installation of the same piece of software on a second computer for using the software twice independently. Therefore, as a consequence of getting two separate requests for a permission to run for the same download, the license sewer now generates an alert and the incident will be investigated.

Generally speaking, the license server receives a request for a permission to run containing identification information, searches for a license matching the identification information that allows the requesting copy to run and, in case it has found such a license, finally grants permission to, run to the requesting copy.

Advantageously, the license to be used is chosen by the server on a "best match first" basis. If there are e.g. two licenses available, one license for "download 121972" if "word processor XYZ, version 3.2" and one assortment license for the office suite that consists of this word processor and other software, the former would be chosen, because it is more specific and does not prevent other users to run another program of the office suite at the same time.

When a user starts his copy of the licensed software, a runtime version of the copy is loaded from persistent storage, e.g. a hard disc, into the memory of the computer. When the actual program is being executed, the start-up verification code contacts the license server. To this, in a preferred embodiment of the present invention the start-up verification code sends a request ticket to the license server. A first request ticket, R1 is already embedded during download in the individual download copy by the download control software. On receiving the request ticket, the license server verifies its authenticity by comparing its content with the associated data stored during download of the individual download copy. If the license server cannot validate the request ticket, it sends a command to the requesting start-up verification code for terminating the execution of the individual download copy. In the other case, the license server searches for a license that grants the requesting copy permission to run, and responds by transmitting a runtime ticket to the start-up verification code if such a license has been found.

The, start-up verification code stores the received runtime ticket in the data segment and/or the code segment of the runtime version of the executable file. The storage space for receiving the ticket data has already been created in the course of fingerprinting at the download of the piece of software.

A simple way to bypass the software protection established with the license enforcement mechanism is to establish a fake license server set up with a trustworthy reproduction of the original license server, but which will always grant permission to run without verifying whether a corresponding license exists and will take care that all requests are redirected to it. An attacker could therewith undermine the license enforcement mechanism. To eliminate any possibility of attacks like this, the verification code contains program code for verifying a received ticket. This ticket verification code is embedded into numerous different locations within the code segment or e.g. into a plurality of subroutines and/or as separate code between any two subroutines during download. The task of the ticket verification code is to verify the integrity of a received ticket so that it can be guaranteed, that the ticket was received from the legitimate license server, To verify, whether the legitimate license server or a fake license server issued a given ticket, any ticket is digitally signed when issued by the license server for example using public key cryptography. If using a public key cryptosystem, the server signs the ticket with a private key and the ticket verification code verifies the signature with the corresponding public key when receiving the ticket.

To further increase the level of security, meta-verification code is embedded to the individual download copy of a piece of software in the course of fingerprint. It makes the verification code tamper-proof by verifying the verification code and uncovering any attempts to modify parts of it. The meta-verification code typically includes checksum evaluation over selected parts of the code segment, which contains one or more parts of the verification code.

The ticket verification code is also part of the permission validation code, which regularly verifies the authenticity of the runtime ticket stored in the data segment. To make it even harder for attackers to reverse engineer the software enforcement mechanism, the permission validation code makes some subtle modifications to the run time environment of the running program when identifying a faked runtime ticket. The modification to the runtime environment will cause the program to crash or freeze sooner or later.

In a further preferred embodiment of the present invention, the ticket verification code as well as the permission validation code placed in the download copy is distributed over many different locations within the code segment, thus making it more difficult for software pirates to discover all of its parts, a necessary condition to invalidate the license enforcement mechanism and to obtain a stable version of a "cracked" piece of software. To prevent that an attacker intercepts the ticket and provides this ticket to an illicit copy of the piece of software, the ticket verification code not only checks the authenticity and integrity of the ticket but also its version. When it finds out, that it is being submitted a ticket of the wrong version, it will carry on like in the case when it detects an illegitimate ticket.

It is obvious from the above explanation, that the ticket verification code will not resume operation before the start-up verification code acknowledges the reception of a new ticket. Otherwise the ticket verification code would only try to verify a ticket that has not yet been received.

Finally, when the user terminates the execution of the software program, the shutdown verification code will be invoked. Although its main responsibility is to inform the license server of the program termination, this message has to be certified to make sure that it does not originate from an untrustworthy location. A primitive notification of a program termination does not prevent from tricking the software protection by simply sending a termination notice to the license server before starting a second copy of a piece of software. The license server therefore sends a log-off ticket during the start-up process along with the runtime ticket, which is also stored in the data segment and/or code segment of the runtime version of the software copy at the client's side. Then, to inform the license server of an imminent program termination, the shutdown verification code just returns this previously obtained log-off ticket. The license server validates the received log-off ticket and memorizes, that the respective software copy has been terminated.

The log-off ticket enables the license server in a preferred embodiment of the present invention to be constantly aware of which download copies are executing at any point in time. After permission to run has been granted to a download copy, the license server adds the identification of the download copy to the log, like e.g. a list of concurrently running programs associated with the corresponding license. As long as the number of entries in the log is smaller than the limit imposed by the license, the license may grant permission to run to further download copies. At receiving a log-off ticket from a download copy in the log, the corresponding entry is removed. In this way, the number of concurrently executing download copies can be limited and hence floating licenses and assortment licenses may easily be enforced.

Generally, the exchange of tickets between the client and the license server forms a way of verifying the synchronization between the license server and the downloaded copy of the piece of software. FIG. 11 illustrates the ticketing mechanism of the license enforcement according to a preferred embodiment of the present invention. The first request ticket R1 is already inserted in the individual download copy during download from the license server. When a user starts his acquired software program for the first time, the start-up verification code contacts the server and submits in step S11 that request ticket R1, which is validated by the license serve: in short order For a clear description of the process it is assumed, that all validations are successful. But it is to be understood, that an invalid ticket found will terminate the execution of the individual download copy sooner or later like described above.

It is important to note that during the ticket exchange two copies of the executable file exist, the first copy is located on persistent storage, e.g. a hard disc. The second copy has been created by the operating system loading the executable file into the memory of the computer after the corresponding program was invoked by the user. The latter copy is actively executing and performing the ticket exchange. However, any modifications to the executable file, e.g. changes in the verification code, are carried out on the copy on persistent storage. Still, for future refinements, the described system comprises means for modifying the executing copy.

The license server replies at the beginning of step S12 by sending T1, a runtime ticket version 1 to the user's client. The verification code embedded in the user's software copy during download is already adapted to verify the authenticity of T1. But this code is not adapted to validate 72, a version 2 runtime ticket. In addition to T1, the license server therefore sends TVC2, a piece of a modified verification code, which is stored on reception by the start-up verification code in the individual download copy on the hard disc of the user's client. Thus, when the user starts his program for a further time, the modified ticket verification code now expects the next highest version for the runtime ticket. Also the request tickets reflect the number of program starts by showing corresponding version indicators. To assure synchronization between the status of the end-user's software copy and the license server, the license server further transmits R2, a request ticket of version 2 along with T1 and the modified piece of verification code. Finally it further sends L1, a log-off ticket of version 1 which is typically stored in the data segment and/or code segment of the runtime version of the user's software copy and its authenticity is verified. The start-up verification code now terminates its operation, ending step S12.

The actual program starts in step S 13 whereby the permission validation code repeatedly validates T1 during program execution. As soon as the user exits his program in step S 14, the shutdown verification code starts and returns the previously received L1 to the license server, which in its turn logs the information about the program termination. If a malicious subject tries to cheat the license enforcement by feigning the termination of the program execution, it will not be able to use a copy of the runtime version for a second run because this copy would ask for a permission to run producing request ticket R1 while the license server would expect being showed request ticket R2, which can only be supplied by the software copy modified on the hard disc.

Alternatively, the new request ticket R2 could be transmitted by the server in reply to L1, i.e. during the shutdown phase. The drawback of this variant is, however, that if the software program crashes while being used, i,e. before the shutdown phase, it will not be in possession of a valid request ticket when invoked for the next time.

Generally speaking, when the program is started, the request ticket Rx obtained from the license server in the course of the preceding start-up is now transmitted by the start-up verification code. In return the start-up verification code receives the new runtime ticket Tx, the new piece, of modified verification code TVCx+1, the appropriate log-off ticket Lx for this x-th run of the program, and the request ticket for the next (x+1)-th run Rx+1. On terminating this run of the program the shutdown verification code returns Lx.

It is to be noted, that storing one or more of the tickets within the download copy is just one of the options for carrying out the present invention. Alternatively, a ticket can e.g. be stored in an extra file or within an already existing file on the client computer, whereby not all tickets have to be stored in the same way.

Advantageously, the server does not only keep track of the current version of the tickets, respectively the number of times the software product has been executed, but in addition monitors the number of executions of each subroutine within the executable file. To this purpose, a counter is implemented—typically by embedding code during the process of fingerprinting—at the beginning of each subroutine, the value of which is initialized to zero in the individual software copy being downloaded from the server. While the software executable file is being run the counter of each subroutine that contains a counter is incremented by one on each invocation of the subroutine. The server obtains the counter values at the process of program termination. These values may be used for statistical surveys, e.g. to find out which subroutines are commonly used and which are obviously considered unnecessary by the end-users.

In a particularly advantageous embodiment of the present invention the individual download copy represents a version of the original executable software file which lacks at least some sections of code and/or data or which has been made unfunctional in other ways. At starting the program, the start-up verification code orders the reinstatement of the program code. The license server examines the request and decides if the client, respectively the start-up verification code is to be supplied with program code and/or data repairing the download copy at least partially.

Conveniently, the order for a reinstatement of the program code is transmitted together with the actual request ticket. To enhance the resistance of the protection mechanism against attacks, only the runtime version of the download copy is repaired, while the copy of this file on the permanent storage medium like the hard disc stays unchanged. In a further particularly preferred embodiment of the present invention, the code for repairing the download copy additionally modifies the copy of the related file on the permanent storage medium, so that a different repair code is necessary at the next start of the program. A malicious subject intercepting the repair code one time is thereby not yet enabled to create an executable version of the program code.

In a further advantageous embodiment of the present invention the license server communicates with the client respectively the verification code not only by exchanging tickets, but in addition asks it to perform certain tasks. The results obtained from it are then taken by the license server as a basis for further decisions, the license server e.g. asks the client to calculate the checksum over a subroutine beginning at a certain address and/or the value of a byte at a certain location. At a correct result, the license server concludes that the code has not been tampered with. To improve tamper resistance even further, the server favorably interrogates the client over seven rounds. Only if the license server allows itself to be convinced of the integrity of the client's answers, will it pass on the information necessary for the client to continue the program execution.

In addition, the tasks may include modifications to the individual download copy or other data received from the license server, like e.g. tickets. In this case, an attacker potentially faces a target changing dynamically with each invocation of the download copy and thus the robustness of the license enforcement mechanism against attacks is improved.

In particular, the tasks to be performed can be specified by sending executable code or the client, having the client execute the code, which e.g. calculates a checksum, and optionally asking the client to return the result of the code execution, e.g. the calculated checksum.

In a further particularly advantageous embodiment of the present invention a virtual machine is implemented in the verification code like e.g. a Java Virtual Machine, allowing a maximum of flexibility, platform independence and client-side security in realizing these interactive interrogation procedures by providing bytecode that can optionally be executed in a sandboxed environment provided by the virtual machine.

A subject with a view to use one and the same copy of its download copy several times on different computers concurrently, might find a way to prevent termination of the runtime version of the respective program although the client returned the log-off ticket to the license server. It may then copy the version of the download copy on the hard disc to another computer and start it there, which will work, because the license server is convinced that the program has been terminated correctly before. The subject might continue this operation and use the software in an unlimited number owning only one license. Therefore, the license server when informed of a program termination effects according to a preferred embodiment of the present invention the runtime version of the download copy to be modified such, that it can no longer be executed. Practically, when the shutdown verification code informs the license server of the impending program termination, the latter enforces modifications on the runtime copy employing one or more of the above described methods. As an example, the license server demands that the shutdown verification code overwrites a central subroutine and checks this by requesting a checksum over an appropriate section of the code. Again, this can be repeated several over several rounds until the server is sure that the modified runtime copy of the software is unusable and logs that the program has been terminated.

Assumed, that an end-user has transferred his download copy of a piece of software from a first computer to a second computer, and now starts the program on the second computer after quitting it on the first, he can be sure that a permission to run will be granted by the license server. Once he has started the software from the second computer another subject trying to restart the first copy on the first computer will not be able to run this piece of software again because it will be detected as an infringement of the licensing conditions. If the licensee intends to use his piece of software on the first computer again, he has to transfer the last copy of it from the second computer back to the first computer. By this means, a licensee can be sure that his rights as the only beneficiary of the acquired software are protected.

At last, it is to be considered that the connection between client and server can fail during a start-up or shut down procedure or that the actual program crashes during execution. Assumed that the request ticket got lost on its way from the license server to the client, due to an incident like e.g. a system crash of the client or an interruption in the connection between server and client, then, on its next program start the client requests a permission to run from the license server with an already outdated version of the request ticket according to the server's state. The reverse situation develops when a log-off ticket sent by a client does not reach the license server. The latter might suspect an illegal second use of the same software copy when the program requests a permission to run the next time.

These scenarios are likely to happen at the present technological state of the art, so that a recovery mechanism is provided in an especially preferred embodiment of the present invention. This recovery mechanism eases the restrictions set by the license server by it accepting also an old or not yet valid request ticket or allowing a certain download copy to be started again although no corresponding log-off ticket was received after the last program invocation for a few but limited times. If the limit is exceeded by an end-user, his license will be frozen automatically. The end-user then has to contact an authorized subject to clarify the situation and to get his license released.

The present invention ensures a reliable software protection for one by controlling the trading of the software licenses and on the other hand by controlling each individual use of a piece of software, whereby the legitimacy of each download software file can be verified by means of a verification code and identifying data embedded in the download software file in the form of an individualized watermark.

The invention claimed is:

1. A method for online software license enforcement comprising:

a license server device performing steps of:

storing:

a master copy of a software product;

at least one download copy of the master copy; and a software license for the software product, said software license comprising identification of a subject and a license policy defining a role for distribution of the software product to said subject;

wherein the role defines distribution privileges granted to the subject in a separately obtained verification of the subject's authorization to perform operations associated with distribution of the software product;

receiving a request from the subject for confirmation of the license in order to run the at least one download copy, wherein said request is made upon an attempt by the subject to run said at least one download copy;

individualizing the download copy by fingerprinting said download copy of the software product with a watermark to link said download copy to the subject downloading it;

linking the individualized download copy of the software product to its respective software license;

evaluating the software license linked to the individualized download copy to determine its associated role;

requesting from a third party trust center a verification that the role associated with the license matches a current status of the subject for restricting operations available to said subject to only those operations that are defined by its role; and transmitting approval to the individualized download copy only upon receipt of the verification from the third party trust center, wherein said approval constitutes a runtime ticket necessary to obtain a fully usable runtime version of the individualized download copy.

2. The method of claim 1 wherein evaluating the software license comprises evaluating multiple software licenses matching the individualized download copy.

3. The method of claim 2 wherein evaluating the multiple software licenses comprises evaluating the multiple software licenses on a "best match first" basis wherein, if there are two or more licenses available, the license is chosen which least restricts use of further individual download copies by the subject.

4. The method of claim 1 wherein the approval is embodied as program code transmitted from the license server device to the individual download copy of the software product necessary to obtain a fully usable runtime version of said individual download copy.

5. The method of claim 1 wherein receiving the request from the individualized download copy comprises receiving a request ticket.

6. The method of claim 5 wherein transmitting the approval comprises transmitting a runtime ticket to the individual download copy.

7. The method of claim 6 further comprising receiving a log-off ticket from the individual download copy indicating termination of an execution of said individual download copy.

8. The method of claim 7 further comprising accepting the log-off ticket only after the individual download copy has proven that its runtime version is unusable.

9. The method of claim 1 wherein individualizing the download copy comprises embedding verification code in one or more subroutines of the download copy.

10. The method of claim 1 wherein individualizing the download copy comprises embedding data in the download copy.

11. The method of claim 1 wherein individualizing the download copy comprises using fingerprinting which is identical for different downloads; and wherein said fingerprinting may be supplied and stored separately from the download to be shared by more than one download copy.

12. The method of claim 9 wherein at least a part of a piece of the verification code is embedded in one or more subroutines to verify validity of at least one type of ticket.

13. The method of claim 12 wherein the verification code embedded in the one or more subroutines increments a counter particular to said subroutine each time said subroutine of said individual download copy of a software product is invoked.

14. The method of claim 13 further comprising:

reading each of said counters; and submitting the counter reading to the license service device upon terminating execution of the individual download copy.

15. The method of claim 1 wherein individualizing the download copy further comprises linking information about the watermark to the software license.

16. A license server device comprising:

storage storing:

a master copy of a software product;

at least one download copy of the master copy; and a software license for the software product, said software license comprising identification of a subject and a license policy defining a role for distribution of the software product to said subject;

wherein the role defines distribution privileges granted to the subject in a separately obtained verification of the subject's authorization to perform operations associated with distribution of the software product;

a non-transitory computer-readable medium having executable instructions that when executed by the license server device perform the steps of:

receiving a request from the subject for confirmation of the license in order to run the at least one download copy, wherein said request is made upon an attempt by the subject to run said at least one download copy; and individualizing the download copy by fingerprinting said download copy of the software product with a watermark to link said download copy to the subject downloading it;

linking the individualized download copy of the software product to its respective software license;

evaluating the software license linked to the individualized download copy to determine its associated role;

requesting from a third party trust center a verification that the role associated with the license matches a current status of the subject for restricting operations available to said subject to only those operations that are defined by its role; and transmitting approval to the individualized download copy upon receipt of the verification from the third party trust center, wherein said approval constitutes a runtime ticket necessary to obtain a fully usable runtime version of the individualized download copy.

17. The license server device of claim 16 wherein the approval is embodied as program code transmitted from the license server device to the individual download copy of the software product necessary to obtain a fully usable runtime version of said individual download copy.

18. The license server device of claim 16 further comprising license management logic for registering the license.

19. The license server device of claim 16 wherein the role comprises at least one selected from a group consisting of: a software supplier, a distributor, a dealer, a dealer specializing in educational licenses, a commercial end user, a government end user, an educational end user, and an anonymous end user.

20. The license server device of claim 16 wherein the individualized download copy comprises embedded verification code in one or more subroutines of the download copy.

21. The license server device of claim 16 wherein the individualized download copy comprises embedded data in the download copy.

22. The license server device of claim 16 wherein the individualized download copy comprises embedded data in the download copy and embedded verification code in one or more subroutines of the download copy.

23. The license server device of claim 20 further comprising a counter associated with the one or more subroutines, said counter being incremented by the verification code each time the one or more subroutines associated with the counter is invoked for monitoring a number of executions of the subroutines.

24. The license server device of claim 23 further comprising logic for:

reading the counter; and submitting the counter reading when the individual download copy terminates execution.

25. The license server device of claim 24 further comprising logic for:

preparing statistical surveys of counter values to determine which subroutines are unnecessary.

26. The license server device of claim 16 further comprising license management logic for registering the license; and assigning the role to the subject upon registration of the license.

27. A method for online software license enforcement comprising:

a license server device performing steps of:

accessing from data storage:

a download copy of a software product; and a software license for the software product, said software license comprising identification of a licensee and a license policy defining a role for distribution of the software product to a subject;

wherein the role defines distribution privileges granted to the subject in a separately obtained verification of the subject's authorization to perform operations associated with distribution of the software product;

receiving a request from the subject for confirmation of the license in order to run the at least one download copy, wherein said request is made upon an attempt by the subject to run said at least one download copy;

individualizing the download copy by fingerprinting said download copy of the software product with a watermark to link said download copy to the subject downloading it;

linking the individualized download copy of the software product to its respective software license;

evaluating the software license linked to the individualized download copy to determine its associated role;

requesting from a third party trust center a verification that the role associated with the license matches a current status of the subject for restricting operations available to said subject to only those operations that are defined by its role; and transmitting approval to the individualized download copy only upon receipt of the verification from the third party trust center, wherein said approval constitutes a runtime ticket necessary to obtain a fully usable runtime version of the individualized download copy.

28. The method of claim 27 wherein individualizing the download copy comprises embedding verification code in one or more subroutines of the download copy.

29. The method of claim 28 further comprising:

monitoring a number of executions of the one or more subroutines by associating a counter with said one or more subroutines: and incrementing the counter each time the one or more subroutines associated with said counter is invoked.

30. The method of claim 29 further comprising:

reading the counter; and submitting the counter reading when the individual download copy terminates execution.

* * * * *